US012356186B2

(12) United States Patent
Liu

(10) Patent No.: US 12,356,186 B2
(45) Date of Patent: Jul. 8, 2025

(54) SYSTEM AND METHOD FOR SECURITY PROTECTION OF NAS MESSAGES

(71) Applicant: NOKIA TECHNOLOGIES OY, Espoo (FI)

(72) Inventor: Jennifer Liu, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/756,812

(22) Filed: Jun. 27, 2024

(65) Prior Publication Data

US 2024/0357350 A1    Oct. 24, 2024

Related U.S. Application Data

(63) Continuation of application No. 18/197,049, filed on May 13, 2023, now Pat. No. 12,081,978, which is a
(Continued)

(51) Int. Cl.
*H04L 29/06*     (2006.01)
*H04W 12/037*    (2021.01)
(Continued)

(52) U.S. Cl.
CPC ......... *H04W 12/06* (2013.01); *H04W 12/037* (2021.01); *H04W 12/0431* (2021.01); *H04W 76/25* (2018.02); *H04W 84/042* (2013.01)

(58) Field of Classification Search
None
See application file for complete search history.

(56) References Cited

U.S. PATENT DOCUMENTS 8,041,335 B2 * 10/2011 Khetawat .............. H04L 63/104
                                                     455/404.1
8,532,614 B2    9/2013 Somasundaram et al.
(Continued)

FOREIGN PATENT DOCUMENTS

CN       102769848 A      11/2012
CN       105532026 A       4/2016
(Continued)

OTHER PUBLICATIONS

Pavia, Joao et al. The evolution and future perspective of security in mobile communications networks. 2017 9th International Congress on Ultra Modern Telecommunications and Control Systems and Workshops (ICUMT). https://ieeexplore.ieee.org/stamp/stamp.jsp?tp=&arnumber=8255180 (Year: 2017).*
(Continued)

*Primary Examiner* — Jeremiah L Avery
(74) *Attorney, Agent, or Firm* — ALSTON & BIRD LLP

(57) ABSTRACT

Systems and methods that provide NAS security protection for mobile networks. In one embodiment, a network element of a mobile network performs a NAS procedure in multiple phases to establish a NAS communication session with User Equipment (UE) when no NAS security context exists. For a first phase, the network element receives an initial NAS message from the UE populated with a subset of NAS protocol Information Elements (IEs) designated for security-related handling, selects a NAS security algorithm for the NAS security context, and sends a response to the UE that indicates the NAS security algorithm. For a second phase, the network element receives a subsequent NAS message from the UE having a NAS message container that contains the initial NAS message populated with each of the NAS protocol IEs for the NAS procedure, and decrypts the NAS
(Continued)

message container of the subsequent NAS message using the NAS security algorithm.

35 Claims, 20 Drawing Sheets

Related U.S. Application Data continuation of application No. 17/278,487, filed as application No. PCT/FI2019/050685 on Sep. 24, 2019, now Pat. No. 11,689,920.

(60) Provisional application No. 62/735,732, filed on Sep. 24, 2018.

(51) Int. Cl.
*H04W 12/0431* (2021.01)
*H04W 12/06* (2021.01)
*H04W 76/25* (2018.01)
*H04W 84/04* (2009.01)

(56) References Cited

U.S. PATENT DOCUMENTS

| | | | |
|---|---|---|---|
| 8,555,064 | B2 | 10/2013 | Suh et al. |
| 8,638,936 | B2 | 1/2014 | Suh et al. |
| 9,942,938 | B2* | 4/2018 | Pragada ............... H04W 76/14 |
| 9,992,710 | B2 | 6/2018 | Shalev et al. |
| 10,470,042 | B2 | 11/2019 | Nair et al. |
| 10,595,254 | B2 | 3/2020 | Kang et al. |
| 10,674,360 | B2 | 6/2020 | Lee et al. |
| 10,771,978 | B2 | 9/2020 | Ben Henda et al. |
| 10,813,161 | B2 | 10/2020 | Moisanen et al. |
| 2008/0076386 | A1* | 3/2008 | Khetawat ............... H04M 3/16 455/410 |
| 2008/0076392 | A1* | 3/2008 | Khetawat .......... H04W 12/0431 455/411 |
| 2009/0082007 | A1 | 3/2009 | De Benedittis et al. |
| 2010/0115275 | A1 | 5/2010 | Suh et al. |
| 2011/0142239 | A1 | 6/2011 | Suh et al. |
| 2013/0265937 | A1* | 10/2013 | Jain ........................ H04W 4/70 370/328 |
| 2013/0269001 | A1 | 10/2013 | Janakiraman et al. |
| 2014/0086177 | A1* | 3/2014 | Adjakple ............... H04W 74/04 370/329 |
| 2016/0309379 | A1 | 10/2016 | Pelletier et al. |
| 2017/0150363 | A1* | 5/2017 | Tenny ................... H04L 63/102 |
| 2017/0171752 | A1* | 6/2017 | Lee ....................... H04W 76/12 |
| 2017/0318463 | A1 | 11/2017 | Lee et al. |
| 2017/0331670 | A1* | 11/2017 | Parkvall ............... H04J 11/0059 |
| 2017/0332431 | A1* | 11/2017 | Kim ....................... H04W 72/51 |
| 2018/0041930 | A1* | 2/2018 | Hampel ............... H04W 12/062 |
| 2018/0083972 | A1 | 3/2018 | Kim |
| 2018/0183855 | A1* | 6/2018 | Sabella ................. G06F 9/5027 |
| 2018/0206275 | A1* | 7/2018 | Jain ........................ H04L 12/56 |
| 2018/0279186 | A1* | 9/2018 | Park .................... H04W 36/302 |
| 2018/0324138 | A1* | 11/2018 | Das ..................... H04L 61/5053 |
| 2018/0324663 | A1* | 11/2018 | Park ..................... H04W 36/22 |
| 2018/0324671 | A1* | 11/2018 | Palnati ............... H04L 12/1407 |
| 2018/0352482 | A1* | 12/2018 | Gage ................. H04W 36/0011 |
| 2018/0352593 | A1 | 12/2018 | Velev et al. |
| 2019/0052339 | A1* | 2/2019 | Zhou ..................... H04W 52/50 |
| 2019/0053120 | A1* | 2/2019 | Park .................... H04W 36/305 |
| 2019/0053313 | A1* | 2/2019 | Zhou ..................... H04W 52/50 |
| 2019/0053319 | A1* | 2/2019 | Jeon ..................... H04L 5/0098 |
| 2019/0083972 | A1 | 3/2019 | Nielsen et al. |
| 2019/0281649 | A1 | 9/2019 | Moisanen et al. |
| 2019/0394641 | A1 | 12/2019 | Niemi et al. |
| 2020/0178076 | A1 | 6/2020 | Ben Henda et al. |
| 2020/0228987 | A1 | 7/2020 | Ben Henda et al. |
| 2021/0168601 | A1 | 6/2021 | Ben Henda et al. |
| 2021/0194933 | A1 | 6/2021 | Ben Henda |

FOREIGN PATENT DOCUMENTS

| | | |
|---|---|---|
| CN | 109076079 A | 12/2018 |
| CN | 110121196 B | 8/2019 |
| KR | 1020100021385 A | 2/2010 |
| KR | 1020100054178 A | 5/2010 |
| KR | 1020170026430 A | 3/2017 |
| RU | 2407237 C2 | 12/2010 |
| RU | 2518945 C2 | 6/2014 |
| WO | WO 2008/000165 A1 | 1/2008 |
| WO | WO 2011/123824 A1 | 10/2011 |
| WO | WO 2019/096075 A1 | 5/2019 |
| WO | WO 2020/060871 A1 | 3/2020 |

OTHER PUBLICATIONS

Yu, Da; Wen, Wushao. Non-access-stratum request attack in E-UTRAN. 2012 Computing, Communications and Applications Conference. https://ieeexplore.ieee.org/stamp/stamp.jsp?tp=&arnumber=6154001 (Year: 2012).*

Schneider, Peter; Horn, Gunther. Towards 5G Security. 2015 IEEE Trustcom/BigDataSE/ISPA. https://ieeexplore.ieee.org/stamp/stamp.jsp?tp=&arnumber=7345407 (Year: 2015).*

"3rd Generation Partnership Project; Technical Specification Group Core Network and Terminals; Non-Access-Stratum (NAS) protocol for 5G System (5GS); Stage 3; (Release 17)", 3GPP TS 24.501 v17.1.0, (Dec. 2020), 746 pages.

"3rd Generation Partnership Project; Technical Specification Group Core Network and Terminals; Non-Access-Stratum (NAS) Protocol for 5G System (5GS); Stage 3 (Release 15)", 3GPP TS 24.501 v15.1.0 (Sep. 2018), 398 pages.

"3rd Generation Partnership Project; Technical Specification Group Core Network and Terminals; Non-Access-Stratum (NAS) protocol for 5G System (5GS); Stage 3; (Release 15)", 3GPP TS 24.501 v15.7.0, (Jun. 2022), 491 pages.

"3rd Generation Partnership Project; Technical Specification Group Core Network and Terminals; Non-Access-Stratum (NAS) protocol for 5G System (5GS); Stage 3; (Release 16)", 3GPP TS 24.501 v16.4.1, (Mar. 2020), 666 pages.

"3rd Generation Partnership Project; Technical Specification Group Services and System Aspects; Security Architecture and Procedures for 5G System (Release 15)", 3GPP TS 33.501 v0.3.0 (Aug. 2017), 44 pages.

"3rd Generation Partnership Project; Technical Specification Group Services and System Aspects; Security architecture and procedures for 5G system (Release 15)", 3GPP TS 33.501 v0.7.1, (Jan. 2018), 113 pages.

"3rd Generation Partnership Project; Technical Specification Group Services and System Aspects; Security architecture and procedures for 5G system (Release 15)", 3GPP TS 33.501 v15.1.0, (Jun. 2018), 152 pages.

"3rd Generation Partnership Project; Technical Specification Group Services and System Aspects; Security architecture and procedures for 5G system (Release 15)", 3GPP TS 33.501 v15.16.0, (Jun. 2022), 192 pages.

"3rd Generation Partnership Project; Technical Specification Group Services and System Aspects; Security architecture and procedures for 5G system (Release 15)", 3GPP TS 33.501 v15.2.0, (Sep. 2018), 175 pages.

"3rd Generation Partnership Project; Technical Specification Group Services and System Aspects; Security architecture and procedures for 5G system (Release 17)", 3GPP TS 33.501 v17.0.0, (Dec. 2020), 253 pages.

"3rd Generation Partnership Project; Technical Specification Group Services and System Aspects; System Architecture for the 5G System; Stage 2 (Release 15)", 3GPP TS 23.501 v15.3.0 (Sep. 2018), 226 pages.

"Guidance on Initial NAS Message Protection", 3GPP TSG SA Meeting #81, SP-180914, (Sep. 13-15, 2018), 1 page.

"LS on Initial NAS Message Protection", 3GPP TSG CT WG1 Meeting #110, C1-182158, (Apr. 16-20, 2018), 1 page.

"LS on Initial NAS Message Protection", 3GPP TSG-SA WG3 Meeting #90Bis, S3-180981, (Feb. 26-Mar. 2, 2018), 1 page.

(56) References Cited

OTHER PUBLICATIONS

3GPP CT1, "Reply LS on Initial NAS Message Protection", 3GPP TSG SA WG3 (Security) Meeting #91Bis, S3-182086, (May 21-25, 2018), 2 pages.
3GPP SA2, "LS Response on Initial NAS Message Protection", 3GPP TSG SA WG3 (Security) Meeting #91Bis, S3-181627, (May 21-25, 2018), 2 pages.
3GPP TSG SA, "Guidance on Initial NAS Message Protection", 3GPP TSG SA WG3 (Security) Meeting #92 ad-hoc, S3-182884, (Sep. 24-28, 2018), 2 pages.
Ahmad, Ijaz et al., "5G Security: Analysis of Threats and Solutions", 2017 IEEE Conference on Standards for communications and Networking (CSCN). https://ieeexplore.ieee.org/stamp/stamp.jsp?tp=&arnumber=8088621 (Year: 2017).
Caragata, "Survey of Network Access Security in UMTS/LTE Networks", the 9th International Conference for Inernet Technology and Secured Transactions (ICITST-2014).
China Mobile et al., "Resolving Editor's Notes on Protection The Initial NAS Message", 3GPP TSG SA WG3 (Security) Meeting #90Bis, S3-180534, (Feb. 26-Mar. 2, 2018), 3 pages.
China Mobile, "Resolving Editor's Notes on Protection the Initial NAS Message", 3GPP TSG SA WG3 (Security) Meeting #90Bis, S3-181005, (Feb. 26-Mar. 2, 2018), 3 pages.
Decision of Refusal for Japanese Application No. 2021-516442 dated Oct. 16, 2023, 9 pages.
Decision to Grant for ARIPO Application No. AP/P/2021/013068 dated Jun. 20, 2024, 7 pages.
Decision to Grant for Russian Application No. 2021111466 dated Mar. 1, 2022, 52 pages.
Ekene, Okoye Emmanuel et al., "Enhanced User Security and Privacy Protection in 4G LTE Network", 2016 IEEE 40th Annual Computer Software and Applications Conference (COMPSAC). https://ieeexplore.ieee.org/stamp/stamp.jsp?tp=&arnumber=7552252 (Year: 2016).
Ericsson, "A Way Forward for the Initial NAS Protection Mechanism", 3GPP TSG SA WG3 (Security) Meeting #92 ad-hoc, S3-183051, (Sep. 24-28, 2018), 2 pages.
Ericsson, "Mobility—Rectification of UE Security Capabilities in NAS Container", 3GPP TSG-SA WG3 Meeting #92, CR 0311, S3-182372, (Aug. 20-24, 2018), 4 pages.
Ericsson, "Removal of Initial NAS Protection (Clause 6.4.6)", 3GPP TSG SA WG3 (Security) Meeting #90Bis, S3-180744, (Feb. 26-Mar. 2, 2018), 2 pages.
Eventhelix, "5G Service-Based Architecture (SBA)", Retrieved from the Internet [Retrieved on Sep. 15, 2022] <URL:https://medium.com/5g-nr/5g-service-based-architecture-sba-47900b0ded0a>., (Oct. 20, 2018), 17 pages.
First Examination Report for Indian Application No. 202127017865 dated Aug. 2, 2022, 6 pages.
Hearing Notice for Indian Application No. 202127017865 dated Feb. 2, 2024, 2 pages.
Henrydoss, James; Bault, Terry. Critical security review and study of DDoS attacks on LTE mobile network. 2014 IEEE Asia Pacific Conference on Wireless and Mobile. https://ieeexplore.ieee.org/stamp/stamp.jsp?tp=&arnumber=6920286 (Year: 2014).
Huawei et al, "Discussion on Initial NAS Message Protection", 3GPP TSG SA WG3 (Security) Meeting #92, S3-182292, (Aug. 20-24, 2018), 3 pages.
Huawei et al., "Discussion on Protection of Initial NAS Message", 3GPP TSG-SA WG3 (Security) Meeting #91Bis, S3-181690, (May 21-25, 2018), 4 pages.
Huawei et al., "Discussion on Protection of Initial NAS Message", 3GPP TSG-SA WG3 (Security) Meeting #92 ad-hoc, S3-183046, (Sep. 24-28, 2018), 4 pages.
Huawei et al., "Remove Initial NAS Message Protection Solution from Claus 6.4.6", 3GPP TSG-SA WG3 (Security) Meeting #91Bis, S3-181727, (May 21-25, 2018), 2 pages.
Huawei, "[Draft] Reply LS to SA2 on Initial NAS Message Protection", 3GPP TSG-SA WG3 (Security) Meeting #91Bis, S3-181691, (May 21-25, 2018), 1 page.
Intel, "[Draft] Reply LS on Initial NAS Message Protection", 3GPP TSG-SA WG3 Meeting #92, S3-182396, (Aug. 20-24, 2018), 2 pages.
Intel, "Initial NAS—Discussion on Initial NAS Protection", 3GPP TSG SA WG3 (Security) Meeting #92 ad-hoc, S3-183041, (Sep. 24-28, 2018), 3 pages.
International Search Report and Written Opinion for Patent Cooperation Treaty Application No. PCT/FI2019/050685 dated Jan. 8, 2020, 14 pages.
Jover et al., "Security Attacks Against the Availability of LTE Mobility Networks: Overview and Research Directions", 2013 16th International Symposium on Wireless Personal Multimedia Communications (WPMC).
Mavoungou, Silvere et al. Survey on Threats and Attacks on Mobile Networks. IEEE Access, vol. 4. https://ieeexplore.ieee.org/stamp/stamp.jsp?tp=&arnumber=7547270 (Year: 2016).
NEC Corporation et al, "Replay Protection of NAS Signalling Messages", 3GPP TSG SA WG3 (Security) Meeting #92bis, S3-182878, (Sep. 24-28, 2018), 2 pages.
NEC Corporation et al., "Ciphering of NAS Signalling", 3GPP TSG SA WG3 (Security) Meeting #92bis, S3-182876, (Sep. 24-28, 2018), 2 pages.
NEC Corporation et al., "Integrity of NAS Signalling Messages", 3GPP TSG SA WG3 (Security) Meeting #92bis, S3-182877, (Sep. 24-28, 2018), 2 pages.
Netmanias, "Integration of Multi-RAT Access", Retrieved from the Internet, [Retrieved on Sep. 15, 2022] <URL:https://www.netmanias.com/en/post/oneshot/14472/4g-lte-5g/integration-of-multi-rat-access>., (Sep. 20, 2019), 3 pages.
Notice of Allowance for Korean Application No. 10-2021-7012361 dated Nov. 25, 2021, 5 pages.
Notice of Allowance for Korean Application No. 10-2022-7006336 dated Aug. 8, 2022, 3 pages.
Notice of Allowance for Korean Application No. 10-2022-7039108 dated Aug. 8, 2023, 5 pages.
Notice of Allowance for U.S. Appl. No. 17/278,487 dated Feb. 10, 2023.
Notice of Allowance for U.S. Appl. No. 18/197,049 dated Dec. 13, 2023.
Notice of Allowance for U.S. Appl. No. 18/197,049 dated Mar. 27, 2024.
Office Action for Algerian Application No. DZ/P/2021/198 dated May 15, 2022, 2 pages.
Office Action for ARIPO Application No. AP/P/2021/013068 dated Oct. 19, 2022, 6 pages.
Office Action for Australian Application No. 2019348793 dated Mar. 23, 2022, 4 pages.
Office Action for Australian Application No. 2019348793 dated Sep. 5, 2022, 4 pages.
Office Action for Canadian Application No. 3,113,894 dated Mar. 30, 2022, 7 pages.
Office Action for Chilean Application No. 2021-00730 dated Jan. 4, 2024, 10 pages.
Office Action for Chilean Application No. 202100730 dated Jun. 22, 2022, 18 pages.
Office Action for Chinese Application No. 201980071244.X dated Apr. 18, 2024, 21 pages.
Office Action for Chinese Application No. 201980071244.X dated Oct. 28, 2023, 18 pages.
Office Action for Colombian Application No. NC2021/0005229 dated Dec. 28, 2023, 20 pages.
Office Action for Egyptian Application No. 454/2021 dated Apr. 19, 2023, 4 pages.
Office Action for Egyptian Application No. 454/2021 dated Feb. 1, 2024, 5 pages.
Office Action for European Application No. 19867540.7 dated May 19, 2022, 5 pages.
Office Action for Indonesian Application No. P00202102952 dated Apr. 12, 2023, 6 pages.
Office Action for Japanese Application No. 2021-516442 dated Feb. 15, 2023, 7 pages.
Office Action for Japanese Application No. 2021-516442 dated May 17, 2022, 7 pages.

(56) References Cited

OTHER PUBLICATIONS

Office Action for Mexican Application No. MX/a/2021/003363 dated Apr. 30, 2024, 6 pages.
Office Action for Russian Application No. 2021111466 dated Oct. 12, 2021, 7 pages.
Office Action for Saudi Arabia Application No. 521421545 dated Apr. 13, 2023, 12 pages.
Office Action for Singapore Application No. 11202102969W dated Jan. 6, 2023, 9 pages.
Office Action for Thailand Application No. 2101001680 dated Jan. 3, 2023, 7 pages.
Office Action for Vietnamese Application No. 1-2021-02262 dated Mar. 31, 2022, 2 pages.
Partial Supplementary European Search Report for European Application No. 19867540.7 dated Sep. 1, 2022, 27 pages.
Qualcomm Incorporated et al., "Initial NAS Security Discussion", 3GPP TSG SA WG3 (Security) Meeting #92, S3-182475, (Aug. 20-24, 2018), 2 pages.
Qualcomm Incorporated, "Alignment Between Partial Ciphering and Hashing Method for Initial NAS Message Security", 3GPP TSG SA WG3 (Security) Meeting #90Bis, S3-180973, (Feb. 26-Mar. 2, 2018), 3 pages.
Qualcomm Incorporated, "Discussion on the Incoming LS from SA2 on Initial NAS Protection", 3GPP TSG SA WG3 (Security) Meeting #91Bis, S3-181767, (May 21-25, 2018), 2 pages.
Qualcomm Incorporated, "Discussion on the Incoming LS from SA2 on Initial NAS Protection", 3GPP TSG SA WG3 (Security) Meeting #91Bis, S3-181769, (May 21-25, 2018), 2 pages.
Qualcomm Incorporated, "Proposed Updates to the CR on Initial NAS Protection", 3GPP TSG SA WG3 (Security) Meeting #91Bis, S3-181934, (May 21-25, 2018), 2 pages.
Qualcomm Incorporated, "Protecting the Initial NAS Messages", 3GPP TSG SA WG3 (Security) Meeting #88, S3-172007, (Aug. 7-11, 2017), 2 pages.
SA3, "LS on Initial NAS Message Protection", 3GPP TSG-SA WG3 Meeting #90Bis, S3-180981, (Feb. 26-Mar. 2, 2018), 1 page.
SA3, "LS Response on Initial NAS Message Protection", 3GPP TSG-SA WG3 Meeting #91, S3-181933, (May 21-25, 2018), 2 pages.
SA3, "LS Response on Initial NAS Message Protection", 3GPP TSG-SA WG3 Meeting #91, S3-182087, (May 21-25, 2018), 2 pages.
Singh, Garima; Shrimankar, Deepti., Security analysis of LTE/SAE networks with the possibilities of tampering E-Utran on NS3. 2017 8th International Conference on Computing, Communication and Networking Technologies (ICCCNT). https:// ieeexplore.ieee.org/stamp/stam.jsp?tp=&arnumber=8204104 (Year: 2017).
Zhi et al., "Layered Security Approach in LTE and Simulation", 2009 3rd International Conference on Anti-Counterfeiting, Security, and Identification in Communication.
ZTE Corporation, "Editorial Modification on Initial NAS Message Protection", 3GPP TSG-SA WG3 Meeting #91, CR 0016, S3-181148, (Apr. 16-20, 2018), 3 pages.
ZTE Corporation, "Modification of Initial NAS Message Protection", 3GPP TSG-SA WG3 Meeting #92 ad-hoc, S3-183040, (Sep. 24-28, 2018), 8 pages.
ZTE Corporation, "Modification on NAS SMC Procedure", 3GPP TSG-SA WG3 Meeting #91, CR 0014 Rev. 1, S3-181546, (Apr. 16-20, 2018), 5 pages.
ZTE Corporation, "Modification on NEF Requirement", 3GPP TSG-SA WG3 Meeting #91, CR 0014, S3-181146, (Apr. 16-20, 2018), 5 pages.
ZTE, "Discussion on Authentication and NAS SMC Handling with Race Condition", 3GPP TSG SA WG3 (Security) Meeting #90Bis, S3-180537, (Feb. 26-Mar. 3, 2018), 4 pages.
ZTE, "Modification on NAS SMC Procedure", 3GPP TSG SA WG3 (Security) Meeting #90Bis, S3-180552, (Feb. 26-Mar. 3, 2018), 6 pages.
Decision to Grant for Chinese Application No. 201980071244.X dated Aug. 22, 2024, 5 pages.
Decision to Grant for Japanese Application No. 2021-516442 dated Apr. 25, 2024, 4 pages.
Notice of Acceptance for Australian Application No. 2023201713 dated May 30, 2024, 3 pages.
Notice of Allowance for Korean Application No. 10-2023-7038581 dated Nov. 14, 2024, 5 pages.
Notice of Allowance for Mexican Application No. MX/a/2021/003363 dated Sep. 26, 2024, 6 pages.
Office Action for Australian Application No. 2019348793 dated Jan. 25, 2023, 4 pages.
Office Action for Australian Application No. 2023201713 dated Mar. 6, 2024, 4 pages.
Office Action for Canadian Application No. 3,113,894 dated Apr. 3, 2024, 3 pages.
Office Action for Chilean Application No. 202100730 dated Jun. 15, 2023, 72 pages.
Office Action for Egyptian Application No. 454/2021 dated Sep. 4, 2024, 4 pages.
Office Action for Singapore Application No. 11202102969W dated Sep. 11, 2024, 19 pages.
Office Action for European Application No. 19867540.7 dated Jan. 20, 2025, 5 pages.
Office Action for Japanese Application No. 2024-021892 dated Feb. 6, 2025, 7 pages.
Office Action for Malaysian Application No. PI2021001558 dated May 14, 2025, 6 pages.
"LS on initial NAS message protection", SA WG2 Meeting #S2-129BIS, S2-1811666, (Nov. 26-30, 2018), 2 pages.
Qualcomm Incorporated, "Support for partial ciphering for initial NAS messages", 3GPP TSG-CT WG1 Meeting #112, C1-185186, (Aug. 20-24, 2018), 21 pages.
Secretary of SA WG2, "Draft Report of SA WG2 meetings #129BIS", SA WG2 Meeting #S2-130, S2-1900002, (Jan. 21-25, 2019).

* cited by examiner

SYSTEM AND METHOD FOR SECURITY PROTECTION OF NAS MESSAGES

CROSS-REFERENCE TO RELATED APPLICATIONS

This application is a continuation of U.S. Non-Provisional patent application Ser. No. 18/197,049, filed May 13, 2023 and entitled "System and Method for Security Protection of NAS Messages," which is a continuation of U.S. Non-Provisional patent application Ser. No. 17/278,487, filed Mar. 22, 2021 and entitled "System and Method for Security Protection of NAS Messages," which is a National Stage Entry of International Patent Application Serial No. PCT/FI2019/050685, filed Sep. 24, 2019, which claims the benefit of priority to U.S. Provisional patent application Ser. No. 62/735,732, filed on Sep. 24, 2018, the entire disclosures of each of which are hereby incorporated herein by reference in their entireties for all purposes.

FIELD

This disclosure is related to the field of communication systems and, in particular, to security in networks.

BACKGROUND

Service providers or carriers implement mobile networks to offer numerous voice and data services to end users of mobile phones or other mobile devices/terminals, which are referred to generally as User Equipment (UE). Some examples of voice services are voice calls, call forwarding, call waiting, etc. Some examples of data services are Internet access, streaming audio, streaming video, online gaming, Internet Protocol television (IP-TV), etc. A mobile network is a type of network where the last link to the end user is wireless. A mobile network generally includes a core network, and one or more Radio Access Networks (RAN) that exchange signaling and data with UEs over a radio interface. A typical mobile network is logically separated into a user plane and a control plane. The user plane is the logical plane responsible for carrying user data being sent over the network, and the control plane is the logical plane responsible for carrying the signaling used to establish communications for a UE. The Third Generation Partnership Project (3GPP) specifications partition cellular protocols into two strata: the Non-Access Stratum (NAS) and the Access Stratum (AS). The AS consists of communications between the UE and the RAN (e.g., eNodeB) occurring via a Radio Frequency (RF) channel. The NAS consists of non-radio signaling traffic between a UE and the core network (e.g., a Mobility Management Entity (MME) for LTE or Access and Mobility Management Function (AMF) for a network generation network). The 3GPP has implemented security procedures to protect control plane messages (e.g., NAS messages) from various attacks. However, it may be beneficial to identify enhanced security procedures that provide further protection for control plane messages.

SUMMARY

Embodiments described herein provide enhanced protection for NAS messages. A NAS procedure (e.g., registration of a UE) includes a set of Information Elements (IEs) that carry information. The embodiments described below set forth ways of protecting the IEs or a subset of the IEs that are sent in NAS messages. Thus, the information carried in the IEs is less vulnerable to malicious attacks.

One embodiment comprises a network element of a mobile network. The network element includes a processor(s), and memory including computer program code executable by the processor. The processor is configured to cause the network element to perform a NAS procedure in multiple phases to establish a NAS communication session between the network element and a UE. For a first phase of the NAS procedure, the processor is further configured to cause the network element to receive an initial NAS message from the UE, where the initial NAS message is populated with a subset of NAS protocol IEs, from the NAS protocol IEs for the NAS procedure, that are designated for security-related handling. The processor is further configured to cause the network element to process the subset of the NAS protocol IEs to determine that a NAS security context does not exist for the UE, select a NAS security algorithm for the NAS security context, and send a response to the UE that indicates the NAS security algorithm and a security key set identifier of the NAS security context. For a second phase of the NAS procedure, the processor is further configured to cause the network element to receive a subsequent NAS message from the UE having a NAS message container that contains the initial NAS message encrypted based on the NAS security algorithm, and decrypt the NAS message container of the subsequent NAS message, where the initial NAS message contained in the NAS message container of the subsequent NAS message is populated with each of the NAS protocol IEs for the NAS procedure.

In another embodiment, for the first phase, the subset of the NAS protocol IEs are encrypted in the initial NAS message using a public key of a Home Public Land Mobile Network (HPLMN) for the UE. The processor is further configured to cause the network element to initiate decryption of the subset of the NAS protocol IEs.

In another embodiment, the network element comprises an Access and Mobility Management Function (AMF) element of the mobile network.

In another embodiment, the processor is further configured to cause the network element to send the subset of NAS protocol IEs as encrypted to a Unified Data Management (UDM) element to decrypt the subset of NAS protocol IEs based on a private key of the HPLMN.

In another embodiment, the initial NAS message comprises a registration request message. The subset of the NAS protocol IEs designated for security-related handling consists of a mobile identity for the UE, a UE security capability indicating one or more NAS security algorithms supported by the UE, a registration type, and a security key set identifier for a NAS security context.

In another embodiment, the response comprises a security mode command message that indicates the NAS security algorithm and the security key set identifier, and the subsequent NAS message received from the UE comprises a security mode complete message having the NAS message container that contains the initial NAS message encrypted based on the NAS security algorithm.

In another embodiment, the mobile network comprises a Fifth-Generation (5G) network.

Another embodiment comprises a method of performing a NAS procedure to establish a NAS communication session between a UE and a network element of a mobile network. For a first phase of the NAS procedure, the method comprises receiving an initial NAS message at the network element from the UE, where the initial NAS message is populated with a subset of NAS protocol IEs, from the NAS protocol IEs for the NAS procedure, that are designated for security-related handling. Further for the first phase, the method comprises processing the subset of the NAS protocol IEs at the network element to determine that a NAS security context does not exist for the UE, selecting a NAS security algorithm at the network element for the NAS security context, and sending a response from the network element to the UE that indicates the NAS security algorithm and a security key set identifier of the NAS security context. For a second phase of the NAS procedure, the method comprises receiving a subsequent NAS message at the network element from the UE having a NAS message container that contains the initial NAS message encrypted based on the NAS security algorithm, and decrypting the NAS message container of the subsequent NAS message at the network element, where the initial NAS message contained in the NAS message container of the subsequent NAS message is populated with each of the NAS protocol IEs for the NAS procedure.

In another embodiment, for the first phase, the subset of the NAS protocol IEs are encrypted in the initial NAS message using a public key of a HPLMN for the UE, and the method further comprises initiating decryption of the subset of the NAS protocol IEs.

In another embodiment, the network element comprises an AMF element of the mobile network, and the step of initiating decryption of the subset of the NAS protocol IEs comprises sending the subset of NAS protocol IEs as encrypted to a UDM element to decrypt the subset of NAS protocol IEs based on a private key of the HPLMN.

In another embodiment, the initial NAS message comprises a registration request message, and the subset of the NAS protocol IEs designated for security-related handling consists of a mobile identity for the UE, a UE security capability indicating one or more NAS security algorithms supported by the UE, a registration type, and a security key set identifier for a NAS security context.

In another embodiment, the response comprises a security mode command message that indicates the NAS security algorithm and the security key set identifier, and the subsequent NAS message received from the UE comprises a security mode complete message having the NAS message container that contains the initial NAS message encrypted based on the NAS security algorithm.

In another embodiment, for the first phase of the NAS procedure, the method comprises the following steps at the UE: identifying the subset of the NAS protocol IEs for the NAS procedure that are designated for security-related handling, inserting the subset of NAS protocol IEs in the initial NAS message, sending the initial NAS message from the UE to the network element, and receiving the response from the network element that indicates the NAS security algorithm and the security key set identifier for the NAS security context. For the second phase of the NAS procedure, the method comprises the following steps at the UE: inserting the NAS protocol IEs for the NAS procedure in the initial NAS message, inserting the initial NAS message in the NAS message container of the subsequent NAS message, encrypting the NAS message container of the subsequent NAS message using the NAS security algorithm, and sending the subsequent NAS message from the UE to the network element.

In another embodiment, for the first phase, the method further includes encrypting, at the UE, the subset of the NAS protocol IEs in the initial NAS message using a public key of a HPLMN for the UE.

Another embodiment comprises a UE that includes a processor(s), and a memory including computer program code executable by the processor. The processor is configured to cause the UE to initiate a NAS procedure in multiple phases to establish a NAS communication session between the UE and a network element of a mobile network. For a first phase of the NAS procedure, the processor is further configured to cause the UE to identify, from NAS protocol IEs for the NAS procedure, a subset of the NAS protocol IEs that are designated for security-related handling. The processor is further configured to cause the UE to insert the subset of NAS protocol IEs in an initial NAS message, send the initial NAS message to the network element, and receive a response from the network element that indicates a NAS security algorithm and security key set identifier for a NAS security context. For a second phase of the NAS procedure, the processor is further configured to cause the UE to insert the NAS protocol IEs for the NAS procedure in the initial NAS message, insert the initial NAS message in a NAS message container of a subsequent NAS message, encrypt the NAS message container of the subsequent NAS message using the NAS security algorithm, and send the subsequent NAS message to the network element.

In another embodiment, for the first phase, the processor is further configured to cause the UE to encrypt the subset of the NAS protocol IEs in the initial NAS message using a public key of a HPLMN for the UE.

In another embodiment, the processor is further configured to cause the UE to encrypt the subset of the NAS protocol IEs in the initial NAS message using the public key when the UE has the public key programmed on a UMTS Subscriber Identify Module (USIM), and send the initial NAS message to the network element without encrypting the subset of the NAS protocol IEs in the initial NAS message when the UE does not have the public key programmed on the USIM.

In another embodiment, the initial NAS message comprises a registration request message, and the subset of NAS protocol IEs designated for security-related handling consists of a mobile identity for the UE, a UE security capability indicating one or more NAS security algorithms supported by the UE, a registration type, and a security key set identifier for a NAS security context.

In another embodiment, the processor is configured to cause the UE to encrypt the subset of the NAS protocol IEs in the initial NAS message using a public key of a HPLMN for the UE when the registration type does not indicate an emergency, and send the initial NAS message to the network element without encrypting the subset of the NAS protocol IEs in the initial NAS message when the registration type indicates an emergency.

In another embodiment, the response comprises a security mode command message that indicates the NAS security algorithm and the security key set identifier, and the subsequent NAS message comprises a security mode complete message having the NAS message container that contains the initial NAS message encrypted based on the NAS security algorithm.

Another embodiment comprises a network element of a mobile network. The network element includes a means for causing the network element to perform a NAS procedure in multiple phases to establish a NAS communication session between the network element and a UE. For a first phase of the NAS procedure, the network element includes a means for receiving an initial NAS message from the UE, where the initial NAS message is populated with a subset of NAS protocol IEs, from the NAS protocol IEs for the NAS procedure, that are designated for security-related handling. The network element further includes a means for processing the subset of the NAS protocol IEs to determine that a NAS security context does not exist for the UE, a means for selecting a NAS security algorithm for the NAS security context, and a means for sending a response to the UE that indicates the NAS security algorithm and a security key set identifier of the NAS security context. For a second phase of the NAS procedure, the network element further includes a means for receiving a subsequent NAS message from the UE having a NAS message container that contains the initial NAS message encrypted based on the NAS security algorithm, and a means for decrypting the NAS message container of the subsequent NAS message, where the initial NAS message contained in the NAS message container of the subsequent NAS message is populated with each of the NAS protocol IEs for the NAS procedure.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

BRIEF DESCRIPTION OF THE DRAWINGS

Some embodiments of the invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
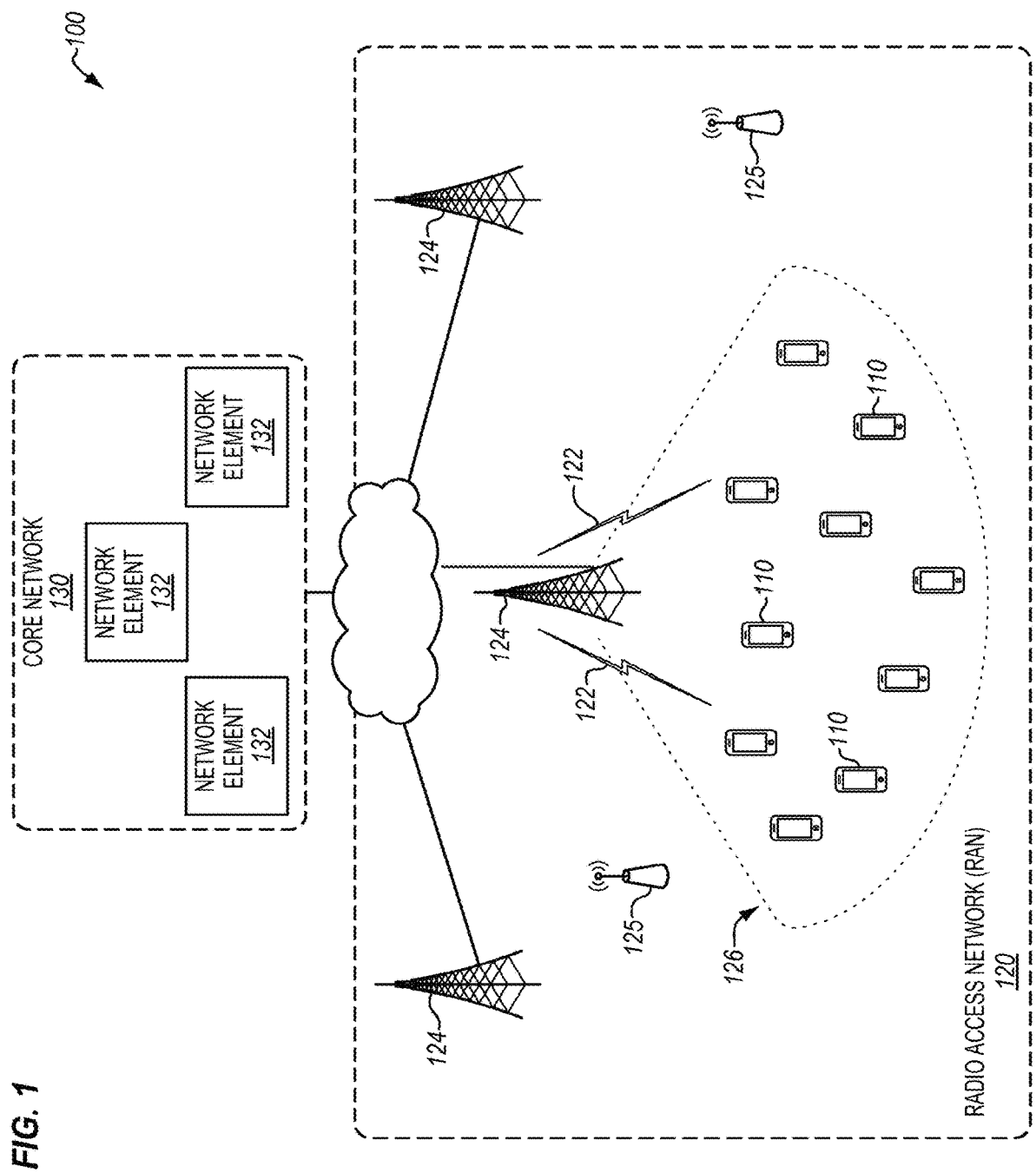
FIG. 1 illustrates a mobile network in an illustrative embodiment.

FIG. 1 illustrates a mobile network 100 in an illustrative embodiment. Mobile network 100 (also referred to as a cellular network) is a type of network where the last link is wireless, and provides voice and/or data services to a plurality of devices. Mobile network 100 may be a Third Generation (3G), a Fourth Generation (4G), and/or a next generation network (e.g., Fifth Generation (5G)).

Mobile network 100 is illustrated as providing communication services to UEs 110 (along with other UEs not shown). UEs 110 may be enabled for voice services, data services, Machine-to-Machine (M2M) or Machine Type Communications (MTC) services, and/or other services. A UE 110 may be an end user device such as a mobile phone (e.g., smartphone), a tablet or PDA, a computer with a mobile broadband adapter, etc.

Mobile network 100 includes one or more Radio Access Networks (RAN) 120 that communicate with UEs 110 over a radio interface 122. RAN 120 may support Evolved-UMTS Terrestrial Radio Access Network (E-UTRAN) access, Wireless Local Area Network (WLAN) access, fixed access, satellite radio access, new Radio Access Technologies (RAT), etc. As an example, RAN 120 may comprise an E-UTRAN or Next Generation RAN (NG-RAN) that includes one or more base stations 124 that are dispersed over a geographic area. A base station 124 may comprise an entity that uses radio communication technology to communicate with a UE on the licensed spectrum, and interface the UE with a core network. Base stations 124 in an E-UTRAN are referred to as Evolved-NodeBs (eNodeB). Base stations 124 in an NG-RAN are referred to as gNodeBs (NR base stations) and/or ng-eNodeBs (LTE base stations supporting a 5G Core Network). As another example, RAN 120 may comprise a WLAN that includes one or more Wireless Access Points (WAP) 125. A WLAN is a network in which a UE is able to connect to a Local Area Network (LAN) through a wireless (radio) connection. A WAP 125 is a node that uses radio communication technology to communicate with a UE over the unlicensed spectrum, and provides the UE access to a core network. One example of WAP 125 is a WiFi access point that operates on the 2.4 GHz or 5 GHz radio bands. The term "base station" as used herein may refer to an eNodeB, a gNodeB, an ng-eNodeB, a WAP, etc.

UEs 110 are able to attach to cell 126 of RAN 120 to access a core network 130. RAN 120 therefore represents the radio interface between UEs 110 and core network 130. Core network 130 is the central part of mobile network 100 that provides various services to customers who are connected by RAN 120. One example of core network 130 is the Evolved Packet Core (EPC) network as suggested by the 3GPP for LTE. Another example of core network 130 is a 5G core network as suggested by the 3GPP. Core network 130 includes network elements 132, which may comprise servers, devices, apparatus, or equipment (including hardware) that provide services for UEs 110. Network elements 132, in an EPC network, may comprise a Mobility Management Entity (MME), a Serving Gateway (S-GW), a Packet Data Network Gateway (P-GW), etc. Network elements 132, in a 5G network, may comprise an Access and Mobility Management Function (AMF), a Session Management Function (SMF), a Policy Control Function (PCF), an Application Function (AF), a User Plane Function (UPF), etc.

Figure 2:
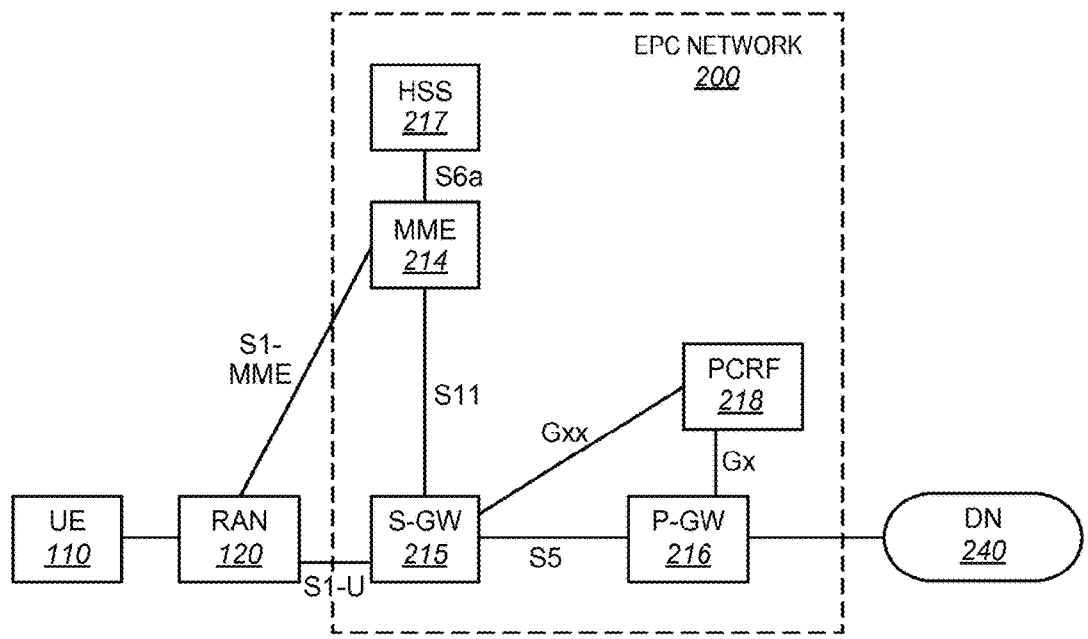
FIG. 2 illustrates an Evolved Packet Core (EPC) network.

FIG. 2 illustrates an Evolved Packet Core (EPC) network 200, which is the core network for LTE. EPC network 200 includes a Mobility Management Entity (MME) 214, a Serving Gateway (S-GW) 215, a Packet Data Network Gateway (P-GW) 216, a Home Subscriber Server (HSS) 217, and a Policy and Charging Rules Function (PCRF) 218, but may include other elements not shown, such as IP Multimedia Subsystem (IMS) Application Servers. Within the EPC network 200, the user data (also referred to as the "user plane") and the signaling (also referred to as the "control plane") are separated. MME 214 handles the control plane within EPC network 200. For instance, MME 214 handles the signaling related to mobility and security for E-UTRAN access. MME 214 is responsible for tracking and paging UE 110 in idle mode. S-GW 215 and P-GW 216 handle the user plane. S-GW 215 and P-GW 216 transport data traffic between UE 110 and external data networks 240 (DN or Packet Data Network (PDN)). S-GW 215 is the point of interconnect between the radio-side and EPC network 200, and serves UE 110 by routing incoming and outgoing IP packets. S-GW 215 is also the anchor point for the intra-LTE mobility (i.e., in case of handover between eNodeBs), and between LTE and other 3GPP accesses. P-GW 216 is the point of interconnect between EPC network 200 and external data networks 240 (i.e., point of ingress or egress for data network 240), and routes packets to and from data network 240. HSS 217 is a database that stores user-related and subscriber-related information. PCRF 218 provides a Policy and Charging Control (PCC) solution in EPC network 200, and is a node or entity of EPC network 200 that formulates PCC rules for services requested by an end user.

MME 214 connects to RAN 120 (i.e., eNodeB) through the S1-MME interface, and S-GW 215 connects to RAN 120 through the S i-U interface. MME 214 connects to S-GW 215 through the S11 interface, and connects to HSS 217 through the S6a interface. PCRF 218 connects to P-GW 216 through the Gx interface, which provides the transfer of policy and charging rules from PCRF 218 to a Policy and Charging Enforcement Function (PCEF) in P-GW 216. PCRF 218 connects to S-GW 215 through the Gxx interface, and S-GW 215 connects to P-GW 216 through the S5 interface.

Figure 3:
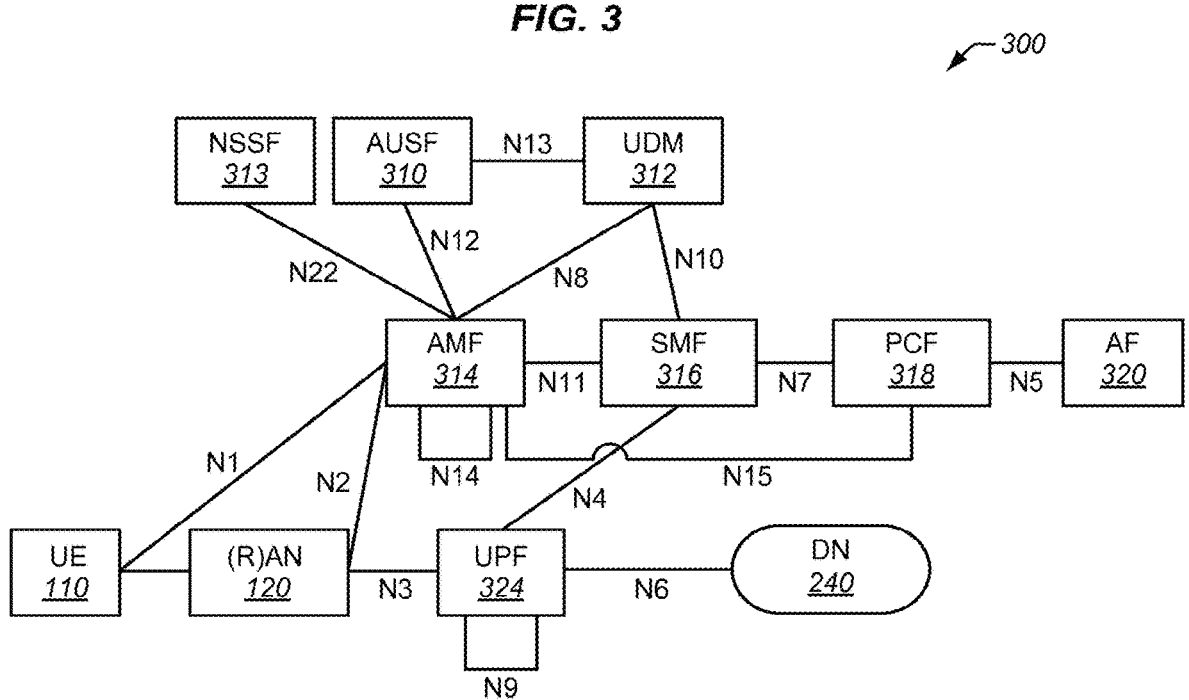
FIG. 3 illustrates a non-roaming architecture of a next generation network.

FIG. 3 illustrates a non-roaming architecture 300 of a next generation network. The architecture in FIG. 3 is a reference point representation, as is further described in 3GPP TS 23.501 (v15.3.0), which is incorporated by reference as if fully included herein. Architecture 300 is comprised of Network Functions (NF) for a core network, and the network functions for the control plane are separated from the user plane. The control plane of the core network includes an Authentication Server Function (AUSF) 310, a Unified Data Management (UDM) 312, a Network Slice Selection Function (NSSF) 313, an Access and Mobility Management Function (AMF) 314, a Session Management Function (SMF) 316, a Policy Control Function (PCF) 318, and an Application Function (AF) 320. The user plane of the core network includes one or more User Plane Functions (UPF) 324 that communicate with data network 240. UE 110 is able to access the control plane and the user plane of the core network through (R)AN 120.

AUSF 310 is configured to support authentication of UE 110. UDM 312 is configured to store subscription data/information for UE 110. UDM 312 may store three types of user data: subscription, policy, and session-related context (e.g., UE location). AMF 314 is configured to provide UE-based authentication, authorization, mobility management, etc. SMF 316 is configured to provide the following functionality: session management (SM), UE Internet Protocol (IP) address allocation and management, selection and control of UPF(s), termination of interfaces towards PCF 318, control part of policy enforcement and Quality of Service (QOS), lawful intercept, termination of SM parts of NAS messages, Downlink Data Notification (DNN), roaming functionality, handle local enforcement to apply QoS for Service Level Agreements (SLAs), charging data collection and charging interface, etc. If UE 110 has multiple sessions, different SMFs may be allocated to each session to manage them individually and possibly provide different functionalities per session. PCF 318 is configured to support a unified policy framework to govern network behavior, and to provide policy rules to control plane functions for QoS enforcement, charging, access control, traffic routing, etc. AF 320 provides information on a packet flow to PCF 318. Based on the information. PCF 318 is configured to determine policy rules about mobility and session management to make AMF 314 and SMF 316 operate properly.

UPF 324 supports various user plane operations and functionalities, such as packet routing and forwarding, traffic handling (e.g., QoS enforcement), an anchor point for Intra-RAT/Inter-RAT mobility (when applicable), packet inspection and policy rule enforcement, lawful intercept (UP collection), traffic accounting and reporting, etc. Data network 240 is not part of the core network, and provides Internet access, operator services, 3rd party services, etc. For instance, the International Telecommunication Union (ITU) has classified 5G mobile network services into three categories: Enhanced Mobile Broadband (eMBB), Ultra-reliable and Low-Latency Communications (uRLLC), and Massive Machine Type Communications (mMTC) or Massive Internet of Things (MIoT). eMBB focuses on services that have high bandwidth requirements, such as HD videos, Virtual Reality (VR), and Augmented Reality (AR). uRLLC focuses on latency-sensitive services, such as automated driving and remote management. mMTC and MIoT focuses on services that include high requirements for connection density, such as smart city and smart agriculture. Data network 240 may be configured to provide these and other services.

Architecture 300 includes the following reference points. The N1 reference point is implemented between UE 110 and AMF 314. The N2 reference point is implemented between (R)AN 120 and AMF 314. The N3 reference point is implemented between (R)AN 120 and UPF 324. The N4 reference point is implemented between the SMF 316 and UPF 324. The N5 reference point is implemented between PCF 318 and AF 320. The N6 reference point is implemented between UPF 324 and data network 240. The N7 reference point is implemented between the SMF 316 and PCF 318. The N8 reference point is implemented between UDM 312 and AMF 314. The N9 reference point is implemented between two UPFs 324. The N10 reference point is implemented between UDM 312 and SMF 316. The N11 reference point is implemented between AMF 314 and SMF 316. The N12 reference point is implemented between AMF 314 and AUSF 310. The N13 reference point is implemented between UDM 312 and AUSF 310. The N reference point is implemented between two AMFs. The N15 reference point is implemented between PCF 318 and AMF 314 in the case of a non-roaming scenario. The N22 reference point is implemented between NSSF 313 and AMF 314.

Figure 4:
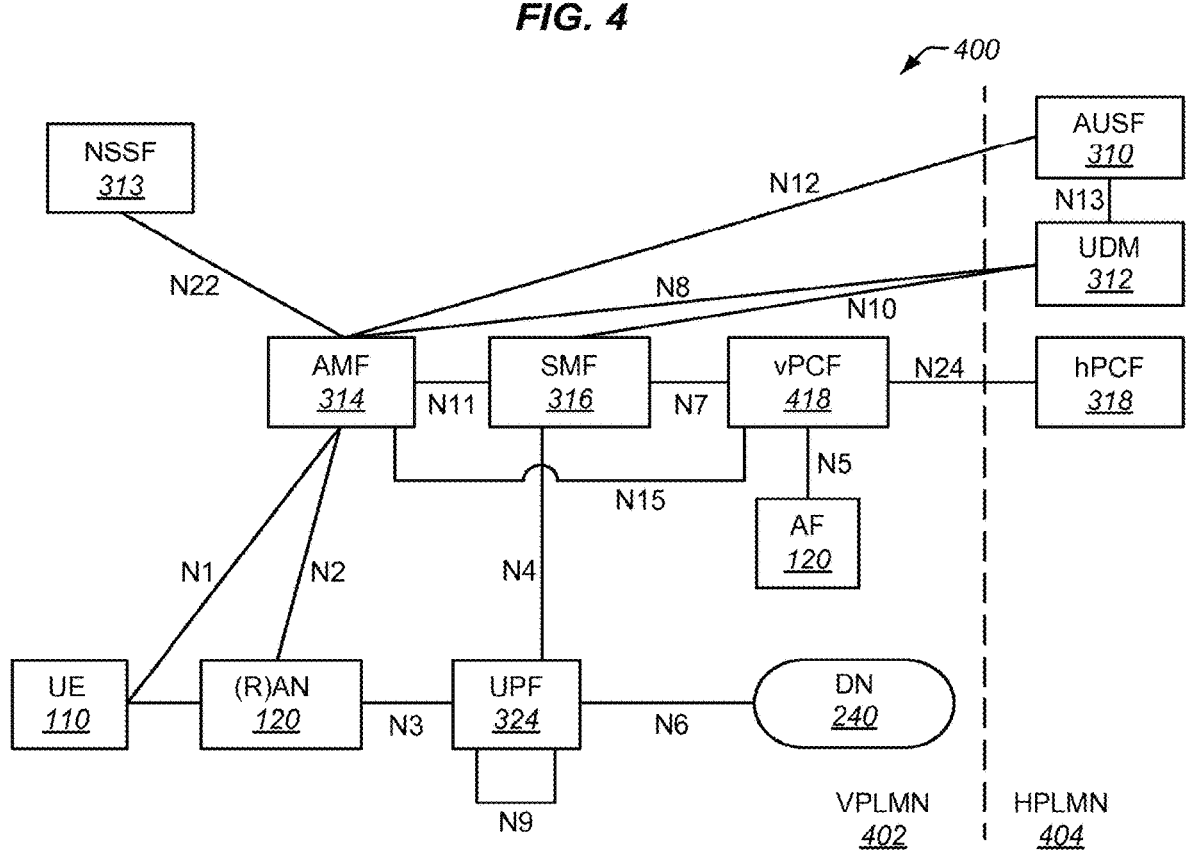
FIG. 4 illustrates a roaming architecture of a next generation network.

FIG. 4 illustrates a roaming architecture 400 of a next generation network. The architecture in FIG. 4 is a local breakout scenario in reference point representation, as is further described in 3GPP TS 23.501 (v15.3.0). In a roaming scenario, a Visited Public Land Mobile Network (VPLMN) 402 and a Home PLMN (HPLMN) 404 are shown. An HPLMN 404 identifies the PLMN in which the profile of a mobile subscriber is held. A VPLMN is a PLMN upon which the mobile subscriber has roamed when leaving their HPLMN. Users roaming to other networks will receive subscription information from the HPLMN 404. In a local breakout scenario, PCF 318 (hPCF), UDM 312, and AUSF 310 are in the HPLMN 404 for UE 110. The other network functions, including a visited PCF (vPCF) 418, are in the VPLMN 402.

Figure 5:
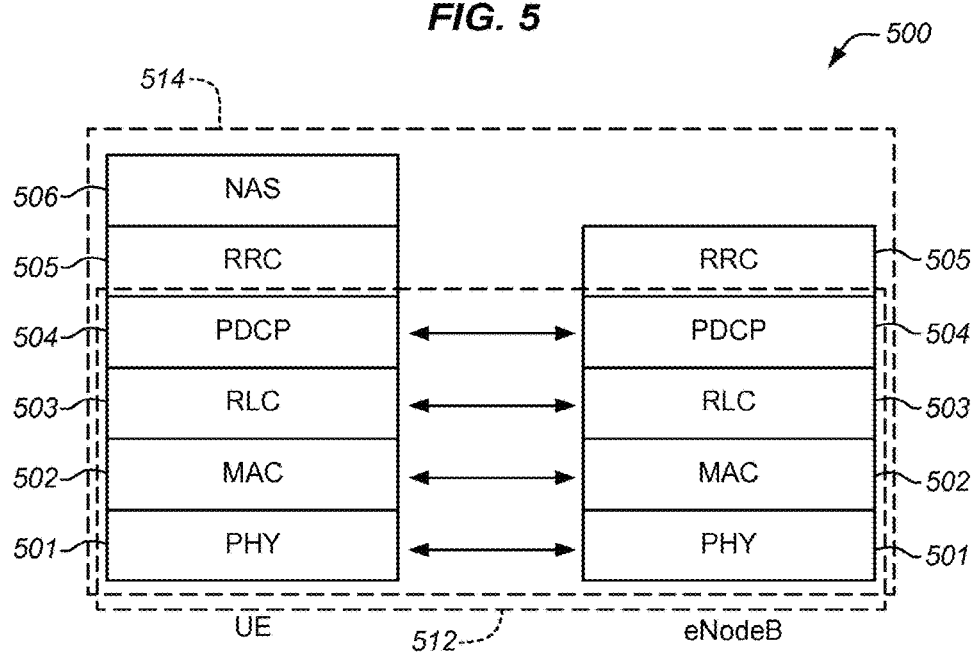
FIG. 5 illustrates a radio protocol stack.

FIG. 5 illustrates a radio protocol stack 500, such as for radio interface 122. As described herein, the user plane 512 comprises a set of protocols used to transfer the actual user data through a network, and the control plane 514 comprises protocols used to control and establish the user connections and bearers within the network. For the user plane 512 and the control plane 514, radio protocol stack 500 includes the physical (PHY) layer 501, the Medium Access Control (MAC) layer 502, the Radio Link Control (RLC) layer 503, and the Packet Data Convergence Protocol (PDCP) layer 504. The control plane 514 additionally includes the Radio Resource Control (RRC) layer 505 and the Non-Access Stratum (NAS) layer 506.

The physical layer 501 carries all information from the MAC transport channels over the radio interface. Data and signaling messages are carried on physical channels between the different levels of physical layer 501. The physical channels are divided into physical data channels and physical control channels. The physical data channels may include the Physical Downlink Shared Channel (PDSCH), the Physical Broadcast Channel (PBCH), the Physical Multicast Channel (PMCH), the Physical Uplink Shared Channel (PUSCH), and the Physical Random Access Channel (PRACH). The physical control channels may include the Physical Control Format Indicator Channel (PCFICH), the Physical Hybrid ARQ Indicator Channel (PHICH), the Physical Downlink Control Channel (PDCCF), and the Physical Uplink Control Channel (PUCCH).

The MAC layer 502 is responsible for mapping between logical channels and transport channels, multiplexing of MAC Service Data Units (SDUs) from one or different logical channels onto transport blocks (TB) to be delivered to the physical layer on transport channels, de-multiplexing of MAC SDUs from one or different logical channels from transport blocks delivered from the physical layer on transport channels, scheduling information reporting, error correction through Hybrid Automatic Repeat Request (HARM), priority handling between UEs by means of dynamic scheduling, priority handling between logical channels of one UE, and logical channel prioritization. The RLC layer 503 is responsible for transfer of upper layer Protocol Data Units (PDUs), error correction through ARQ, and concatenation, segmentation and reassembly of RLC SDUs. The RLC layer 503 is also responsible for re-segmentation of RLC data PDUs, reordering of RLC data PDUs, duplicate detection, RLC SDU discard. RLC re-establishment, and protocol error detection. The PDCP layer 504 is responsible for header compression and decompression of IP data, transfer of data (user plane or control plane), maintenance of PDCP Sequence Numbers (SNs), in-sequence delivery of upper layer PDUs at re-establishment of lower layers, duplicate elimination of lower layer SDUs at re-establishment of lower layers for radio bearers mapped on RLC Acknowledged Mode (AM), ciphering and deciphering of user plane data and control plane data, integrity protection and integrity verification of control plane data, timer-based discard, duplicate discarding, etc. The RRC layer 505 is responsible for the broadcast of System Information related to the NAS, broadcast of System Information related to the Access Stratum (AS), paging, establishment, maintenance, and release of an RRC connection between the UE and RAN, security functions including key management, establishment, configuration, maintenance, and release of point-to-point Radio Bearers (RB). The NAS layer 506 represents the highest stratum of the control plane 514 between the UE and the core network (e.g., MME/AMF), and supports the mobility of the UE and the session management procedures to establish and maintain IP connectivity between the UE and the core network.

One of the objectives of networks is to improve overall system security. One particular area of concern is security protection of NAS messages. In the embodiments described herein, a UE 110 and a network element 132 are enhanced to provide additional security protection of NAS messages.

Figure 6:
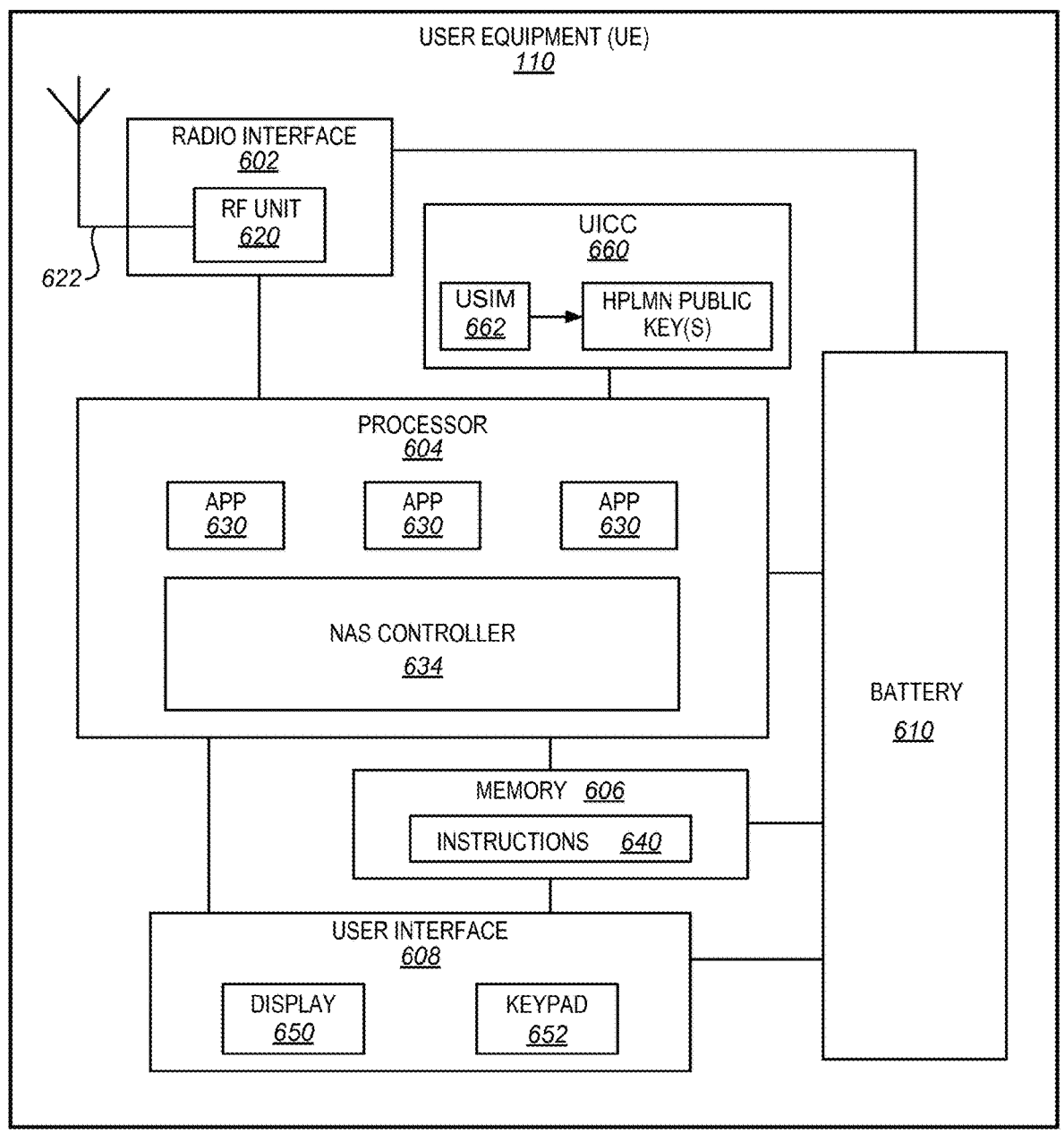
FIG. 6 is a block diagram of a UE in an illustrative embodiment.

FIG. 6 is a block diagram of a UE 110 in an illustrative embodiment. UE 110 includes a radio interface component 602, one or more processors 604, a memory 606, a user interface component 608, and a battery 610. Radio interface component 602 is a hardware component that represents the local radio resources of UE 110, such as an RF unit 620 (e.g., transceiver) and one or more antennas 622, used for wireless communications with a base station (e.g., base station 124) via radio or "over-the-air" signals. Processor 604 represents the internal circuitry, logic, hardware, software, etc., that provides the functions of UE 110. Processor 604 may be configured to execute instructions 640 for software that are loaded into memory 606. Processor 604 may comprise a set of one or more processors or may comprise a multi-processor core, depending on the particular implementation. Memory 606 is a computer readable storage medium for data, instructions 640, applications, etc., and is accessible by processor 604. Memory 606 is a hardware storage device capable of storing information on a temporary basis and/or a permanent basis. Memory 606 may comprise a random-access memory, or any other volatile or non-volatile storage device. User interface component 608 is a hardware component for interacting with an end user. For example, user interface component 608 may include a display 650, screen, touch screen, or the like (e.g., a Liquid Crystal Display (LCD), a Light Emitting Diode (LED) display, etc.). User interface component 608 may include keyboard or keypad 652, a tracking device (e.g., a trackball or trackpad), a speaker, a microphone, etc. UE 110 also includes a Universal Integrated Circuit Card (UICC) 660, which is a hardware device that provides security and integrity functions for UE 110. UICC 660 may host a Universal Subscriber Identity Module (USIM) 662 that stores or indicates one or more public keys for the HPLMN for UE 110 along with other credentials. UE 110 may include various other components not specifically illustrated in FIG. 6.

Processor 604 may implement one or more applications 630. These applications 630 may access downlink (DL) data through RAN 120 and core network 130, and may also generate uplink (UL) data for transfer to a destination through RAN 120 and core network 130. Processor 604 also implements a NAS controller 634 that is configured to control NAS procedures, as is described in more detail below.

Figure 7:
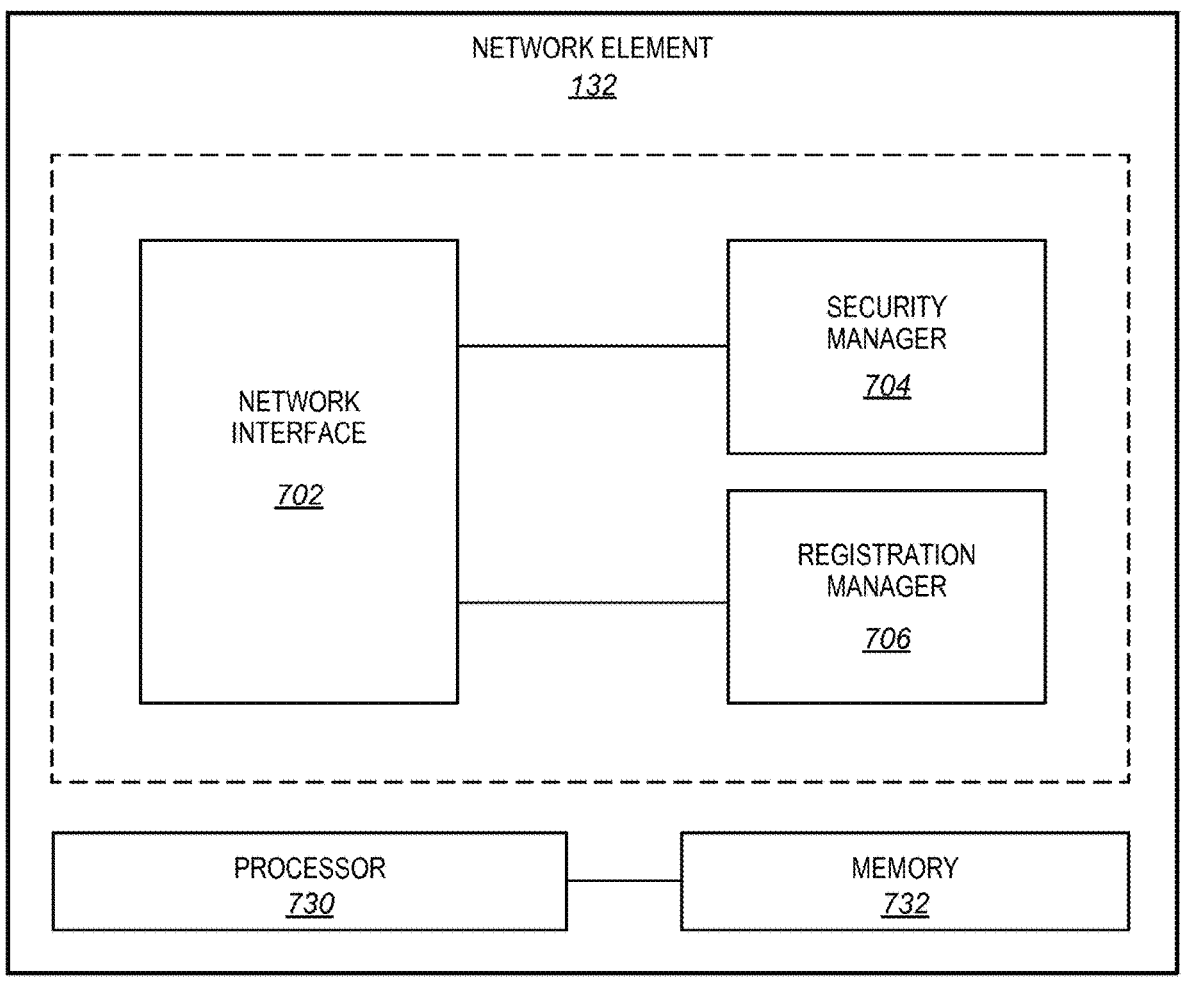
FIG. 7 is a block diagram of a network element in an illustrative embodiment.

FIG. 7 is a block diagram of a network element 132 in an illustrative embodiment. Network element 132 is a server, device, apparatus, equipment (including hardware), system, means, etc., that handles security and registration for a UE. For example, network element 132 may comprise an MME 214 in an LTE network, an AMF element 314 of a next generation network, etc. In this embodiment, network element 132 includes the following subsystems: a network interface component 702, a security manager 704, and a registration manager 706 that operate on one or more platforms. Network interface component 702 may comprise circuitry, logic, hardware, means, etc., configured to exchange control plane messages or signaling with other network elements and/or UEs (e.g., through RAN 120). Network interface component 702 may operate using a variety of protocols (including NAS protocol) or reference points. Security manager 704 may comprise circuitry, logic, hardware, means, etc., configured to handle authentication and/or security procedures for a UE, such as to create a NAS security context, select a NAS security algorithm(s) for a NAS security context, etc. Registration manager 706 may comprise circuitry, logic, hardware, means, etc., configured to handle registration for a UE.

One or more of the subsystems of network element 132 may be implemented on a hardware platform comprised of analog and/or digital circuitry. One or more of the subsystems of network element 132 may be implemented on a processor 730 that executes instructions stored in memory 732. Processor 730 comprises an integrated hardware circuit configured to execute instructions, and memory 732 is a non-transitory computer readable storage medium for data, instructions, applications, etc., and is accessible by processor 730.

Network element 132 may include various other components not specifically illustrated in FIG. 7.

A NAS procedure may be performed or invoked when a NAS security context already exists between a UE and an Access Security Management Entity (e.g., AMF, MME, etc.). The purpose of NAS security is to securely deliver NAS messages between the UE and the Access Security Management Entity in the control plane using NAS security keys. The NAS security keys are generated each time authentication is performed for a UE. After the NAS security setup is completed, the UE and the Access Security Management Entity get to share a NAS encryption key and a NAS integrity key, which are used in encryption and integrity protection, respectively, of NAS messages before transmitting. A NAS procedure may also be performed or invoked when no NAS security context exists. This scenario is described first.

Example 1

No Security Context

Figure 8:
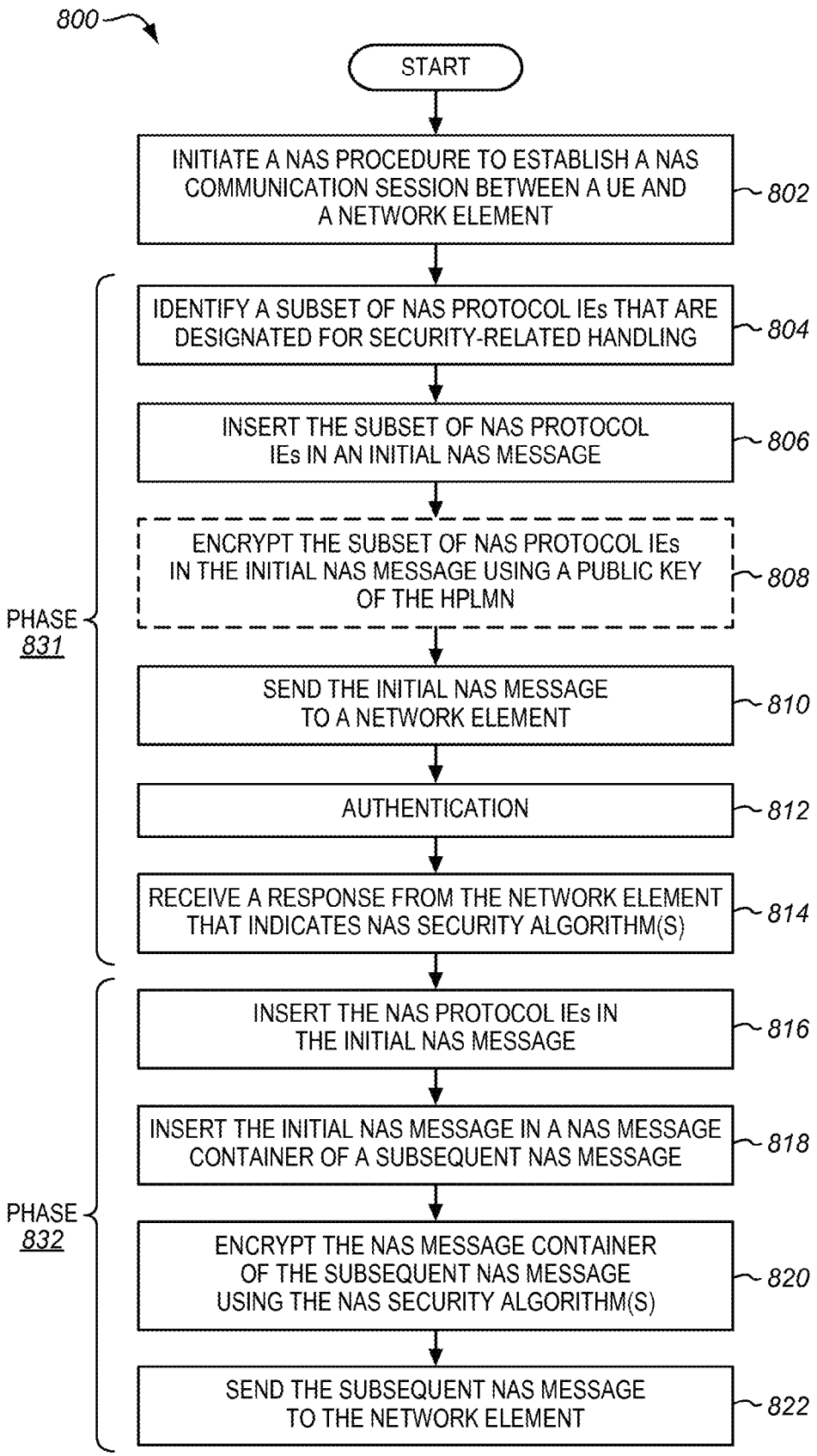
FIG. 8 is a flow chart illustrating a method of performing a NAS procedure in a UE in an illustrative embodiment.

FIG. 8 is a flow chart illustrating a method 800 of performing a NAS procedure in UE 110 in an illustrative embodiment. The steps of method 800 will be described with reference to UE 110 in FIG. 6, but those skilled in the art will appreciate that method 800 may be performed in other networks or architectures. Also, the steps of the flow charts described herein are not all inclusive and may include other steps not shown, and the steps may be performed in an alternative order.

It may be assumed for this embodiment that there is no NAS communication session between UE 110 and network element 132. It may be further assumed that UE 110 is in a non-connected mode (e.g., idle mode), and is transitioning to connected mode. NAS controller 634 in UE 110 initiates a NAS procedure to establish a NAS communication session between UE 110 and network element 132 (step 802). For example, the NAS procedure may comprise a registration procedure. Each NAS procedure includes a set of mandatory NAS protocol IEs, and may also include a set of optional NAS protocol IEs for transmitting information. Thus. NAS controller 634 may identify the NAS protocol IEs (mandatory and optional) for the NAS procedure.

In this embodiment, the NAS procedure is performed in multiple phases 831-832. For the first phase 831 of the NAS procedure, NAS controller 634 identifies a subset of NAS protocol IEs that are designated for security-related handling (step 804). The subset of NAS protocol IEs designated for security-related handling refers to the IEs used to create or establish a NAS security context for a UE. It may be desirable to provide minimal information in the first phase 831, so the subset of NAS protocol IEs may include a minimum number of IEs for the NAS procedure that are used to establish a NAS security context. For a registration procedure, in one example, the subset of NAS protocol IEs may consist of a mobile identity for the LE (e.g., 5G-GUTI or Subscription Concealed Identifier (SUCI)), a UE security capability indicating one or more security algorithms supported by the UE, a registration type (e.g., initial, mobility, periodic, emergency, etc.), and a security key set identifier for a NAS security context of the UE (e.g., ngKSI, eKSI, etc.).

NAS controller 634 may format or generate an initial NAS message for the NAS procedure, such as a registration request of type "initial" An initial NAS message refers to the first NAS message that is sent after a UE transitions from a non-connected mode (e.g., idle mode) to a connected mode. NAS controller 634 includes or inserts the subset of NAS protocol IEs in the initial NAS message (step 806). In the first phase 831, the initial NAS message is populated with the subset of NAS protocol IEs, and the IEs that are populated in the initial NAS message are limited to (i.e., consists only or exclusively of) the subset of NAS protocol IEs that are selected for security-related handling. Because the initial NAS message does not include all of the mandatory NAS protocol IEs for the NAS procedure, the initial NAS message is considered a "partial" message in the first phase 831. The other mandatory NAS protocol IEs that are excluded from the subset will be included in another NAS message (as part of the second phase 832). NAS controller 634 then sends the initial NAS message to network element 132 (step 810).

Before sending the initial NAS message, NAS controller 634 may optionally encrypt the subset of NAS protocol IEs in the initial NAS message using a public key of the HPLMN for UE 110 (optional step 808). Each HPLMN may assign public keys according to the Elliptic Curve Integrated Encryption Scheme (ECIES). Depending on the protection scheme, there may be multiple public keys. The public keys of the HPLMN are typically provisioned on USIM 662 of UE 110. Thus, NAS controller 634 is able to encrypt the subset of NAS protocol IEs identified for the first phase 831 in the initial NAS message. A decision on whether or not to encrypt the subset of NAS protocol IEs using the public key may be based on a policy or criteria. For example, NAS controller 634 may encrypt the subset of NAS protocol IEs when the registration type does not indicate an emergency (e.g., registration type=initial), and may send the initial NAS message without encryption when the registration type indicates an emergency. In another example, NAS controller 634 may encrypt the subset of NAS protocol IEs when UE 110 has the public key programmed on its USIM 662, and may send the initial NAS message without encryption when UE 110 does not have the public key programmed on USIM 662.

Figure 9:
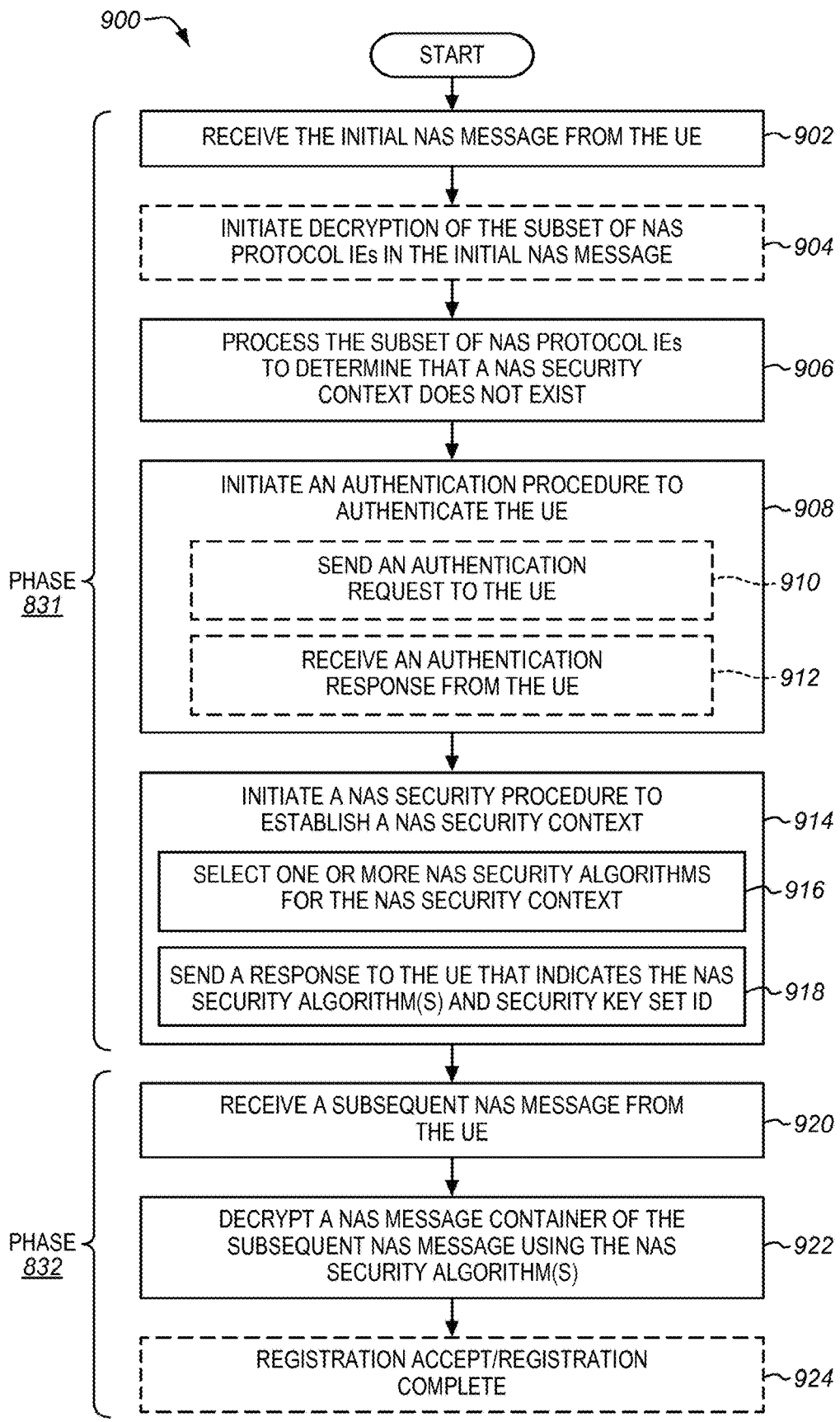
FIG. 9 is a flow chart illustrating a method of performing a NAS procedure in a network element in an illustrative embodiment.

FIG. 9 is a flow chart illustrating a method 900 of performing a NAS procedure in a network element 132 in an illustrative embodiment. The steps of method 900 will be described with reference to network element 132 in FIG. 7, but those skilled in the art will appreciate that method 900 may be performed in other networks or architectures.

For the first phase 831, network interface component 702 of network element 132 receives the initial NAS message from UE 110 (step 902). After receiving the initial NAS message, security manager 704 may optionally process the initial NAS message to determine whether information is encrypted using the public key of the HPLMN. When the initial NAS message is encrypted, security manager 704 may initiate decryption of the subset of NAS protocol IEs in the initial NAS message (optional step 904). In one example, security manager 704 may be configured to decrypt the subset of NAS protocol IEs internally. In another example, security manager 704 may send the subset of NAS protocol IEs to another network element (e.g., a UDM element 312) to decrypt the subset of NAS protocol IEs.

Security manager 704 processes the subset of NAS protocol IEs, and determines that no NAS security context exists for UE 110 (step 906). Because no NAS security context exists, security manager 704 may initiate an authentication procedure to authenticate UE 110 (step 908). The authentication procedure (e.g., Authentication and Key Agreement (AKA)) is used to perform mutual authentication between UE 110 and mobile network 100. Although authentication procedures may vary, in general, security manager 704 may send an authentication request to UE 110 along with an authentication token (optional step 910) through network interface component 702. In response to the authentication request, UE 110 handles authentication steps on its end, and attempts to validate the authentication token (see step 812 of FIG. 8). If successful, UE 110 considers mobile network 100 to be authenticated. UE 110 computes a response token, and sends an authentication response with the response token, which is received by security manager 704 (optional step 912) through network interface component 702. Security manager 704 (or another network element) may then determine whether the response token is valid (e.g., compare the response token with an expected response token). If the response token is valid, then security manager 704 considers UE 110 authenticated.

With UE 110 validated, security manager 704 initiates a NAS security procedure to establish a NAS security context (step 914). For the NAS security procedure, security manager 704 selects one or more NAS security algorithms for the NAS security context (step 916), and derives one or more NAS security keys (e.g., KAMF, KASME, etc.). A NAS security algorithm may include a NAS ciphering algorithm and integrity protection algorithm. Security manager 704 then sends a response to UE that indicates or includes the NAS security algorithm(s) and a security key set identifier selected for the NAS security context (step 918) through network interface component 702. The response may comprise a Security Mode Command that includes the NAS security algorithm(s), a security key set identifier (e.g., ngKSI, cKSI, etc.), and other information.

In FIG. 8. NAS controller 634 of UE 110 receives the response from network element 132 that indicates the NAS security algorithm(s) and security key set identifier (step 814). With the information provided in the response from network element 132, a NAS security context is established between LE 110 and network element 132. Thus, subsequent NAS messages between UE 110 and network element 132 may be secured using the NAS security context.

For the second phase 832 of the NAS procedure, NAS controller 634 includes or inserts the NAS protocol IEs for the NAS procedure in the initial NAS message (step 816). The initial NAS message is a copy, duplicate, or same type of initial NAS message that was previously sent to network element 132 in the first phase 831. In this step, the initial NAS message includes the entire set of NAS protocol IEs for the NAS procedure (mandatory and optional (if desired)). Because the initial NAS message includes each of the mandatory NAS protocol IEs for the NAS procedure, the initial NAS message is considered a "complete" NAS message in the second phase 832.

NAS controller 634 of UE 110 may format or generate a subsequent NAS message for the NAS procedure. For example, the subsequent NAS message may comprise a Security Mode Complete message. NAS controller 634 includes or inserts the initial NAS message in a NAS message container of the subsequent NAS message (step 818). A NAS message container is a type of IE used to encapsulate a plain NAS message. NAS controller 634 encrypts the NAS message container of the subsequent NAS message using the NAS security algorithm(s) (step 820). Thus, the complete initial NAS message is encrypted in the NAS message container of the subsequent NAS message. NAS controller 634 then sends the subsequent NAS message to network element 132 (step 822).

In FIG. 9, for the second phase 832, network interface component 702 receives the subsequent NAS message from UE 110 (step 920). Security manager 704 decrypts the NAS message container of the subsequent NAS message using the NAS security algorithm(s) (step 922) to access the complete initial NAS message. Security manager 704 or other subsystems of network element 132 may then process the NAS protocol IEs from the complete initial NAS message to further perform the NAS procedure. For example, registration manager 706 may send a registration accept message to UE 110, and receive a registration complete message from UE 110 (optional step 924). One technical benefit of this process is that only the NAS protocol IEs that are needed to establish a NAS security context are sent as unencrypted or encrypted according to the HPLMN public key in a partial initial NAS message, while a complete initial NAS message is encrypted in a subsequent NAS message, which provides further security protection.

Figure 10:
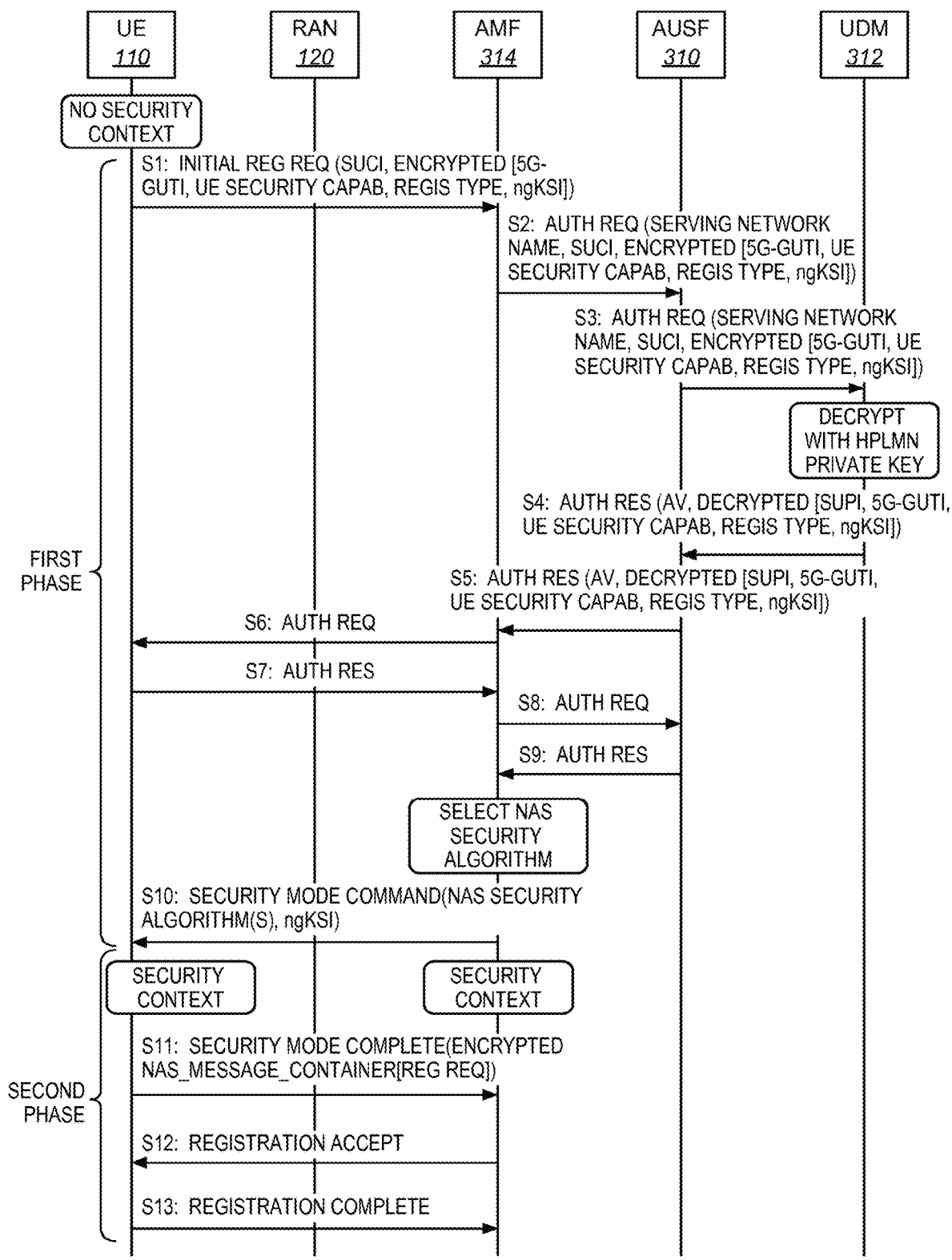
FIG. 10 is a message diagram showing a NAS procedure when a UE has no security context in an illustrative embodiment.

FIG. 10 is a message diagram showing a NAS procedure when a UE has no security context in an illustrative embodiment. The NAS procedure shown in FIG. 10 is a registration procedure, but similar concepts may apply to other NAS procedures. This example is shown in a 5G network, with network element 132 comprising an AMF element 314.

This NAS procedure is again performed in multiple phases. For the first phase. UE 110 generates or formats an initial registration request for a NAS registration procedure. The NAS registration procedure has a set of NAS protocol IEs (mandatory and optional) that are used to transfer information. In this embodiment. UE 110 does not populate the initial registration request with a full set of NAS protocol IEs in the first phase. Instead. UE 110 identifies the NAS protocol IEs that are essential for establishing a NAS security context. Thus, UE 110 identifies a subset of the NAS protocol IEs that are designated for security-related handling. In this example, the subset of NAS protocol IEs may consist of a 5G Globally Unique Temporary Identity (5G-GUTI), the UE security capability, registration type, and ngKSI. UE 110 inserts the subset of NAS protocol IEs in the initial registration request. Because the initial registration request does not include all of the mandatory NAS protocol IEs for the NAS registration procedure, the initial registration request is a "partial" request in the first phase. UE 110 may also insert other information in the initial registration request, such as the SUCI generated b$_y$ UE 110. In this example, UE 110 encrypts the subset of NAS protocol IEs using the HPLMN public key, and sends the initial registration request to AMF element 314 (S1). The protection scheme and public key identifier used for encryption is the same as the protection scheme and public key identifier indicated in the SUCI. However, as was described above, encryption of the subset of NAS protocol IEs using the HPLMN public key is optional. If the protection scheme of SUCI is NULL, then the subset of NAS protocol IEs is not encrypted.

In response to receiving the initial registration request. AMF element 314 routes the information to the UE's home UDM for decrypting based on UE's PLMN ID and Routing ID. Thus, AMF element 314 formats an or generates authentication request (i.e., Nausf_UEAuthentication_Authenticate Request), and inserts the encrypted subset of NAS protocol IEs in the authentication request, along with other information (e.g., SUCI and serving network name). AMF element 314 then sends the authentication request to AUSF element 310 (S2). In response to receiving the authentication request. AUSF element 310 formats or generates an authentication request (i.e., Nudm_UEAuthentication_Get Request), and inserts the encrypted subset of NAS protocol IEs in the authentication request, along with other information. AUSF element 310 then sends the authentication request to UDM element 312 (S3).

In response to the authentication request, UDM element 312 decrypts the subset of NAS protocol IEs using the HPLMN private key (i.e., using the information according to the protection scheme selected for SUCI) so that the subset of NAS protocol IEs are readable. UDM element 312 also hosts functions related to the Authentication Credential Repository and Processing Function (ARPF), which selects an authentication method and computes the authentication data and keying materials (e.g., tokens) for the AUSF element 310 (if needed). UDM element 312 formats or generates an authentication response (i.e., Nudm_UEAuthentication_Get Response) for AUSF element 310, and inserts the decrypted subset of NAS protocol IEs, the authentication vector (AV), and other information in the authentication response. UDM element 312 then sends the authentication response to AUSF element 310 (S4). In response to receiving the authentication response. AUSF element 310 formats or generates an authentication response (i.e., Nuasf_UEAuthentication_Authenticate Response) for AMF element 314, and inserts the decrypted subset of NAS protocol IEs, the AV, and other information in the authentication response. AUSF element 310 then sends the authentication response to AMF element 314 (S5).

AMF element 314 is configured to perform an authentication procedure with UE 110 using information provided by UDM/AUSF. For example, AMF element 314 sends an authentication request to UE 110 along with an authentication token (S6) from the AV, and UE 110 attempts to validate the authentication token. If successful, UE 110 computes a response token, and sends an authentication response with the response token, which is received by AMF element 314 (S7). AMF element 314 formats or generates another authentication request (i.e., Nausf_UEAuthentication_Authenticate Request), and inserts the response token from UE 110 in the authentication request, along with other information. AMF element 314 then sends the authentication request to AUSF element 310 (S8). AUSF element 310 verifies whether the response token from UE 110 matches an expected response token, and sends an authentication response (i.e., Nausf_UEAuthentication_Authenticate Response) to AMF element 314 indicating success/failure of the authentication.

When UE 110 is authenticated to the network. AMF element 314 initiates a NAS security procedure to establish a NAS security context. AMF element 314 selects a NAS security algorithm (or multiple algorithms) for ciphering and integrity protection. AMF element 314 formats or generates a Security Mode Command message, and inserts an indicator of the NAS security algorithm(s), the ngKSI, and other information in the Security Mode Command message. AMF element 314 then sends the Security Mode Command message to UE 110 (S10).

For the second phase of the NAS procedure, UE 110 uses the ngKSI and NAS security algorithm to derive corresponding keys for protecting subsequent NAS messages. A NAS security context is therefore established between UE 110 and AMF element 314. LE 110 includes or inserts the NAS protocol IEs for NAS registration procedure in the initial registration request, which is a copy, duplicate, or same type of message as the initial registration request previously sent in the first phase. The initial registration request includes all of the mandatory NAS protocol IEs, and any optional NAS protocol IEs that are used to transfer information. The additional NAS protocol IEs may include: Non-current native NAS key set identifier, 5G Mobility Management (MM) capability, Requested Network Slice Selection Assistance Information (NSSAI), last visited registered Tracking Area Identifier (TAI), 51 UE network capability, uplink data status, PDU session status, Mobile Initiated Connection Only (MICO) indication. UE status, additional GUTI, allowed PDU session status. UE's usage setting, requested Discontinuous Reception (DRX) parameters, EPS NAS message container, and payload container. Thus, the initial registration request is a "complete" request in the second phase, as it includes all of the mandatory NAS protocol IEs. UE 110 formats or generates a Security Mode Complete message, and inserts the complete initial registration request in a NAS message container of the Security Mode Complete message. UE 110 encrypts the NAS message container of the Security Mode Complete message using the NAS security algorithm of the NAS security context. Thus, the complete initial registration request is encrypted in the NAS message container of the Security Mode Complete message. UE 110 then sends the Security Mode Complete message to AMF element 314 (S1).

AMF element 314 receives the Security Mode Complete message from UE 110, and decrypts the NAS message container of the Security Mode Complete message to access the NAS protocol IEs from the complete initial registration request. AMF element 314 then continues with the registration procedure, such as by sending a registration accept message to UE 110 (S12). UE 110 replies to AMF element 314 with a registration complete message (S13), at which point UE 110 is registered with the network to access services.

Example 2

No Security Context

Figure 11:
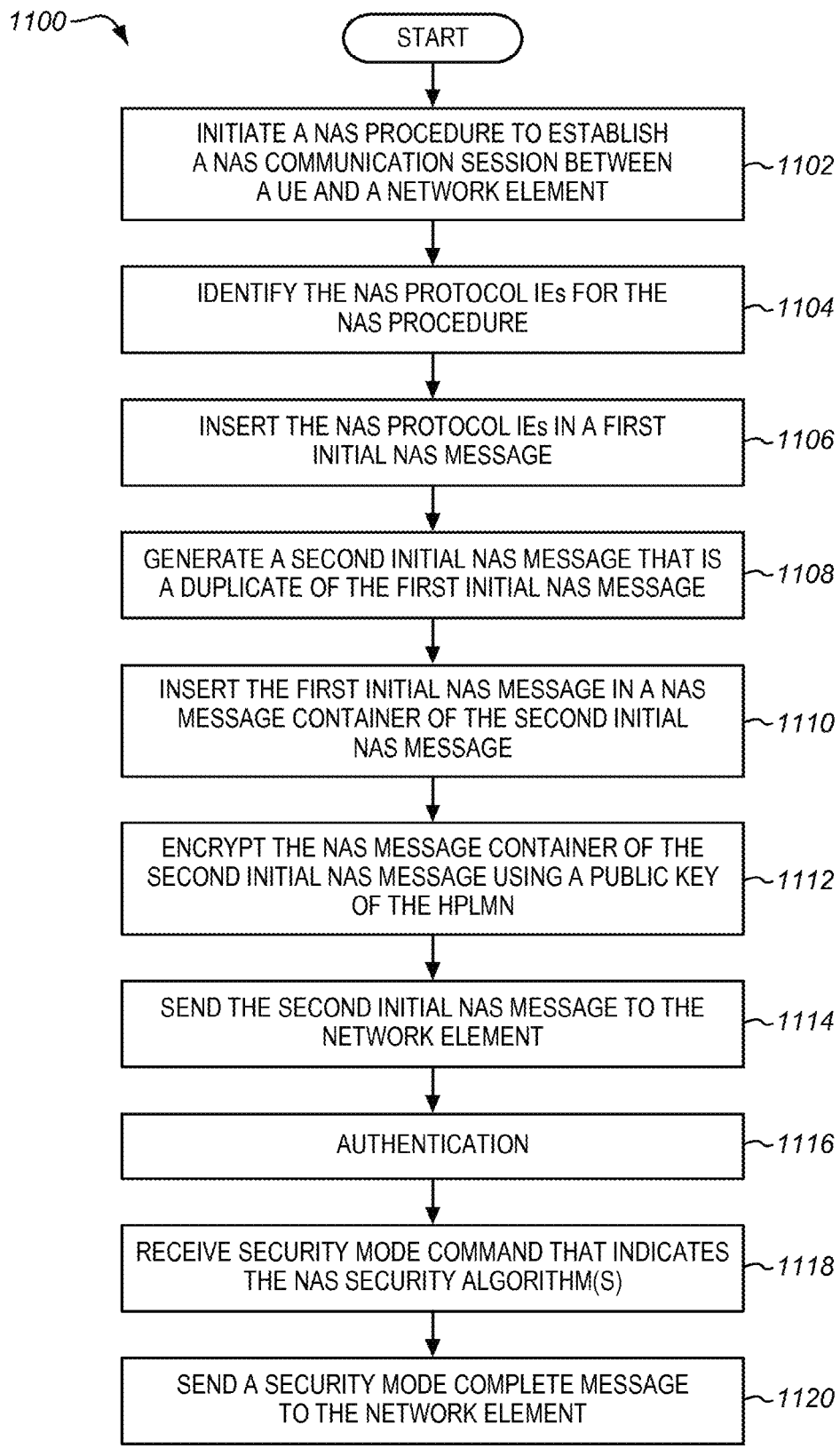
FIG. 11 is a flow chart illustrating a method of performing a NAS procedure in UE 110 in another illustrative embodiment.

In another example of a NAS procedure when no security context exists, FIG. 11 is a flow chart illustrating a method 1100 of performing a NAS procedure in UE 110 in an illustrative embodiment. NAS controller 634 in UE 110 initiates a NAS procedure to establish a NAS communication session between UE 110 and network element 132 (step 1102). NAS controller 634 identifies the NAS protocol IEs (mandatory and optional) for the NAS procedure (step 1104). NAS controller 634 may format or generate a first initial NAS message for the NAS procedure, and includes or inserts the NAS protocol IEs in the first initial NAS message (step 1106). In this step, the first initial NAS message includes the entire set of NAS protocol IEs for the NAS procedure (mandatory and optional (if desired)). Because the first initial NAS message includes each of the mandatory NAS protocol IEs for the NAS procedure, the first initial NAS message is considered a "complete" NAS message.

NAS controller 634 also formats or generates a second initial NAS message that is a duplicate of the first initial NAS message (step 1108). A duplicate message refers to a message of the same type for a NAS procedure. For example, if the first initial NAS message is a registration request, then the second initial NAS message is also a registration request. However, the IEs that are populated in the duplicate message may be different than the original message. NAS controller 634 includes or inserts the first initial NAS message in a NAS message container of the second initial NAS message (step 1110). NAS controller 634 encrypts the NAS message container of the second initial NAS message using a public key of the HPLMN for UE 110 (step 1112). Thus, the complete first initial NAS message is encrypted in the NAS message container of the second initial NAS message. NAS controller 634 then sends the second initial NAS message to network element 132 (step 1114).

Figure 12:
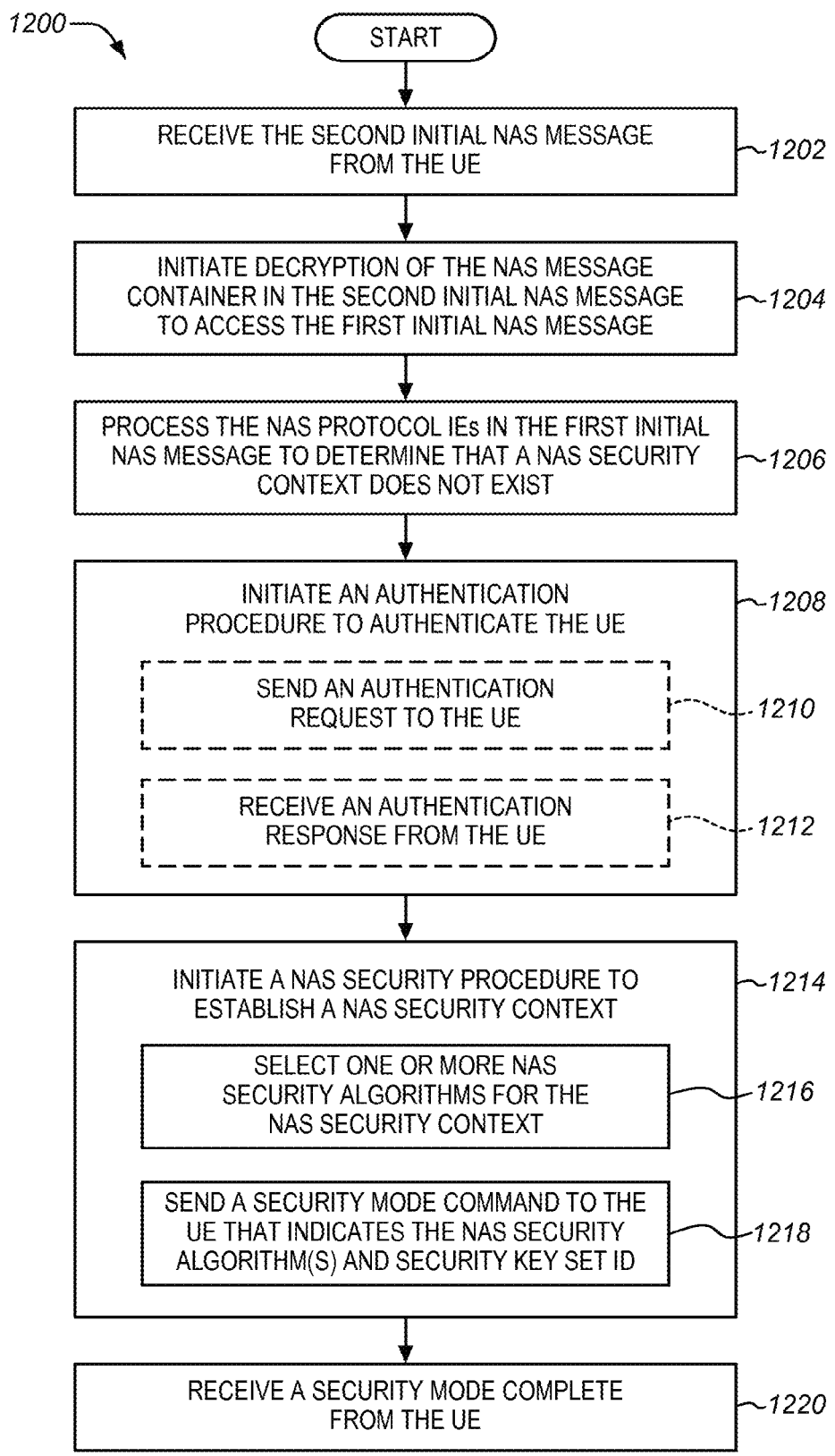
FIG. 12 is a flow chart illustrating a method of performing a NAS procedure in a network element in another illustrative embodiment.

FIG. 12 is a flow chart illustrating a method 1200 of performing a NAS procedure in a network element 132 in an illustrative embodiment. Network interface component 702 of network element 132 receives the second initial NAS message from UE 110 (step 1202). When the NAS message container is encrypted as in this example, security manager 704 initiates decryption of the NAS message container (step 1204) to access the first initial NAS message. In one example, security manager 704 may be configured to decrypt the NAS message container. In another example, security manager 704 may send the NAS message container to another network element (e.g., a UDM element 312) to decrypt the NAS message container.

With the NAS message container decrypted, security manager 704 has access to the first initial NAS message. The first initial NAS message is populated with the NAS protocol IEs for the NAS procedure. Security manager 704 may process the NAS protocol IEs, and determine that no NAS security context exists for UE 110 (step 1206). Because no NAS security context exists, security manager 704 may initiate an authentication procedure to authenticate UE 110 (step 1208). For the authentication procedure, security manager 704 may send an authentication request to UE 110 along with an authentication token (optional step 1210) through network interface component 702. In response to the authentication request, UE 110 handles authentication steps on its end, and attempts to validate the authentication token (see step 1116 of FIG. 11). If successful, UE 110 considers mobile network 100 to be authenticated. UE 110 computes a response token, and sends an authentication response with the response token, which is received by security manager 704 (optional step 1212) through network interface component 702. Security manager 704 (or another network element) may then determine whether the response token is valid (e.g., compare the response token with an expected response token). If the response token is valid, then security manager 704 considers UE 110 authenticated.

With UE 110 validated, security manager 704 initiates a NAS security procedure to establish a NAS security context (step 1214). For the NAS security procedure, security manager 704 selects one or more NAS security algorithms for the NAS security context (step 1216), and derives one or more NAS security keys (e.g., KAMF. KASME, etc.). Security manager 704 then formats or generates a Security Mode Command, and sends the Security Mode Command to UE 110 that indicates or includes the NAS security algorithm(s) and security key set identifier selected for the NAS security context (step 1218) through network interface component 702.

In FIG. 11, NAS controller 634 of UE 110 receives the Security Mode Command from network element 132 that indicates the NAS security algorithm(s) (step 1118). With the information provided in the Security Mode Command, a NAS security context is established between UE 110 and network element 132. Thus, subsequent NAS messages between UE 110 and network element 132 may be secured using the NAS security context. NAS controller 634 of UE 110 may then format or generate a Security Mode Complete message, and send the Security Mode Complete message to network element 132 (step 1120).

In FIG. 12, network interface component 702 receives the Security Mode Complete from UE 110 (step 1220). Security manager 704 may decrypt any subsequent NAS messages using the NAS security algorithm(s). One technical benefit of this process is that only the NAS protocol IEs that are needed to establish a NAS security context are inserted as unencrypted in a partial initial NAS message, while a complete initial NAS message is encrypted in the partial initial NAS message, which provides further security protection.

Figure 13:
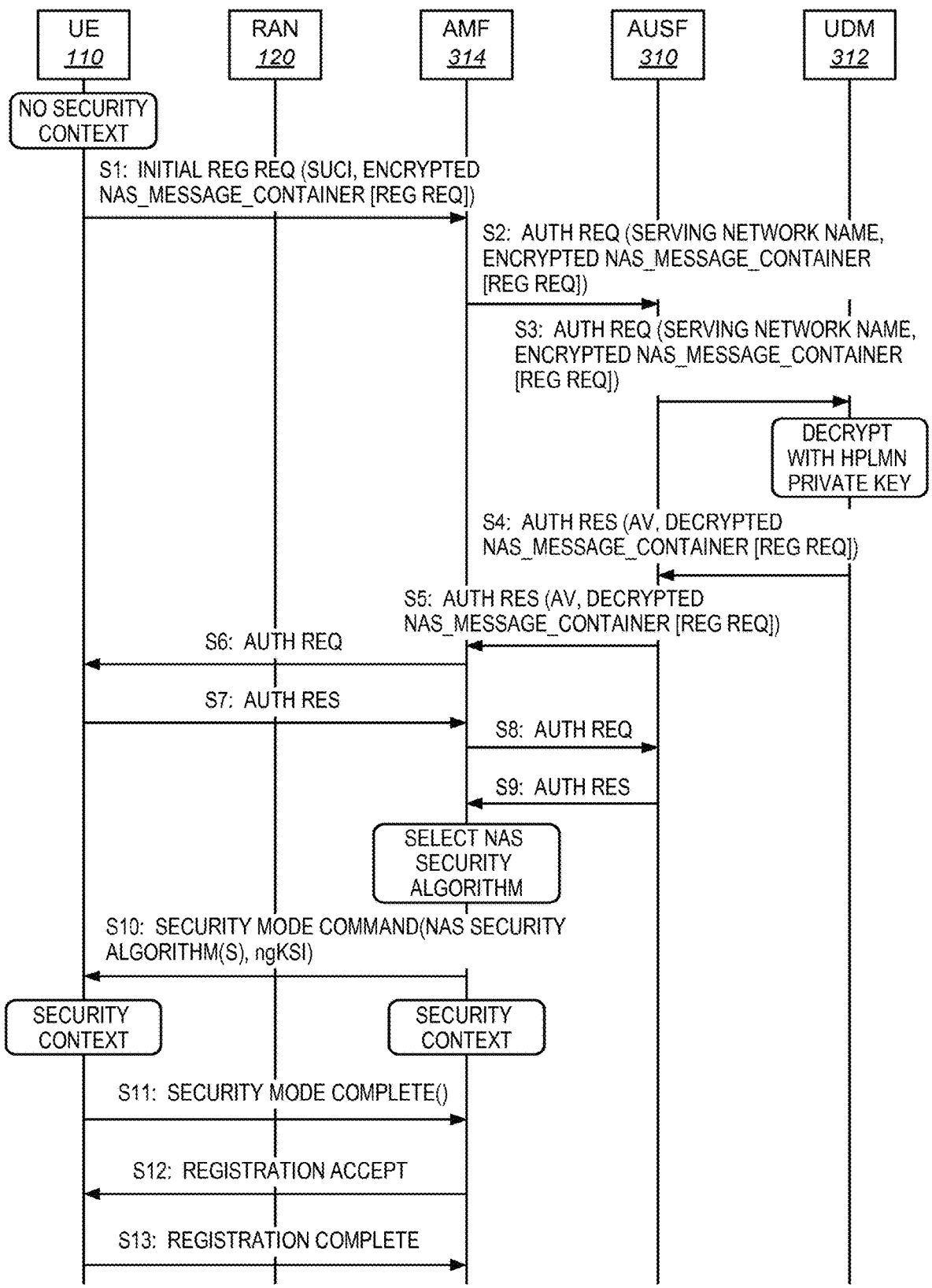
FIG. 13 is a message diagram showing a NAS procedure when a UE has no security context in an illustrative embodiment.

FIG. 13 is a message diagram showing a NAS procedure when a UE has no security context in an illustrative embodiment. The NAS procedure shown in FIG. 13 is a registration procedure, but similar concepts may apply to other NAS procedures. UE 110 generates or formats a registration request for a NAS registration procedure. In this embodiment, UE 110 populates the registration request with a full set of NAS protocol IEs. Thus, the registration request is a complete registration request.

UE 110 also generates or formats another registration request that is a duplicate of the complete registration request. The other registration request is of type "initial", and is therefore an initial registration request. Instead of populating each of the mandatory NAS protocol IEs in the complete registration request. UE 110 inserts the complete registration request in a NAS message container of the initial registration request. UE 110 may also insert other information in the initial registration request, such as the SUCI generated by UE 110. In this example, UE 110 encrypts the NAS message container of the initial registration request using the HPLMN public key, and sends the initial registration request to AMF element 314 (S1).

In response to receiving the initial registration request, AMF element 314 routes the information to the UE's home UDM for decrypting based on UE's PLMN ID and Routing II). Thus, AMF element 314 formats or an generates authentication request (i.e., Nausf_UEAuthentication_Authenticate Request), and inserts the encrypted NAS message container of the initial registration request in the authentication request, along with other information. AMF element 314 then sends the authentication request to AUSF element 310 (S2). In response to receiving the authentication request, AUSF element 310 formats or generates an authentication request (i.e., Nudm_UEAuthentication_Get Request), and inserts the encrypted NAS message container in the authentication request, along with other information. AUSF element 310 then sends the authentication request to UDM element 312 (S3).

In response to the authentication request, UDM element 312 decrypts the encrypted NAS message container using the HPLMN private key so that the complete registration request is readable. UDM element 312 also selects an authentication method and computes the authentication data and keying materials (e.g., tokens) for the AUSF element 310 (if needed). UDM element 312 formats or generates an authentication response (i.e., Nudm_UEAuthentication_Get Response) for AUSF element 310, and inserts the decrypted NAS message container, the authentication vector (AV), and other information in the authentication response. UDM element 312 then sends the authentication response to AUSF element 310 (S4). In response to receiving the authentication response, AUSF element 310 formats or generates an authentication response (i.e., Nuasf_UEAuthentication_Authenticate Response) for AMF element 314, and inserts the decrypted NAS message container, the AV, and other information in the authentication response. AUSF element 310 then sends the authentication response to AMF element 314 (S5).

AMF element 314 is configured to perform an authentication procedure with UE 110 using information provided by UDM/AUSF. For example, AMF element 314 sends an authentication request to UE 110 along with an authentication token (S6) from the AV, and UE 110 attempts to validate the authentication token. If successful, UE 110 computes a response token, and sends an authentication response with the response token, which is received by AMF element 314 (S7). AMF element 314 formats or generates another authentication request (i.e., Nausf_UEAuthentication_Authenticate Request), and inserts response token from UE 110 in the authentication request, along with other information. AMF element 314 then sends the authentication request to AUSF element 310 (S8). AUSF element 310 verifies whether the response token from UE 110 matches an expected response token, and sends an authentication response (i.e., Nausf_UEAuthentication_Authenticate Response) to AMF element 314 indicating success/failure of the authentication.

When UE 110 is authenticated to the network. AMF element 314 initiates a NAS security procedure to establish a NAS security context. AMF element 314 selects a NAS security algorithm (or multiple algorithms) for ciphering and integrity protection. AMF element 314 formats or generates a Security Mode Command message, and inserts an indicator of the NAS security algorithm, the ngKSI, and other information in the Security Mode Command message. AMF element 314 then sends the Security Mode Command message to UE 110 (S10). UE 110 uses the ngKSI and NAS security algorithm to derive corresponding keys for protecting subsequent NAS messages. A security context is therefore established between UE 110 and AMF element 314. UE 110 formats or generates a Security Mode Complete message, and sends the Security Mode Complete message to AMF element 314 (S11).

AMF element 314 continues with the registration procedure, such as by sending a registration accept message to UE 110 (S12). UE 110 replies to AMF element 314 with a registration complete message (S13), at which point UE 110 is registered with the network to access services.

Example 3

Security Context Exists—Security Context is Valid

In further examples, a NAS procedure may be performed or invoked when a NAS security context already exists between a UE and an Access Security Management Entity (e.g., AMF, MME, etc.). The following provides examples of a NAS procedure when a NAS security context exists.

Figure 14:
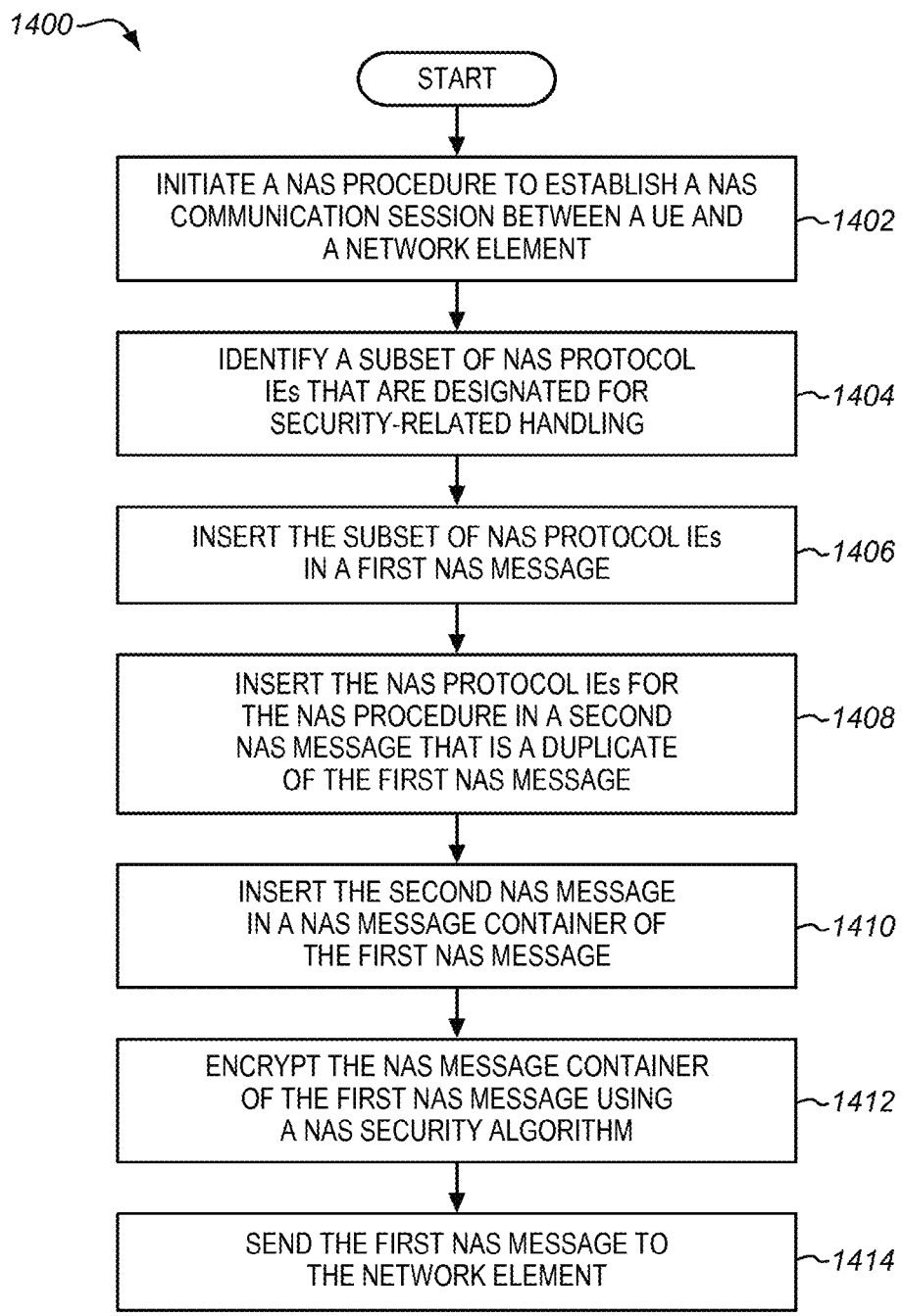
FIG. 14 is a flow chart illustrating a method of performing a NAS procedure in a UE in another illustrative embodiment.

FIG. 14 is a flow chart illustrating a method 1400 of performing a NAS procedure in UE 110 in an illustrative embodiment. NAS controller 634 in UE 110 initiates a NAS procedure to establish (or re-establish) a NAS communication session between UE 110 and network element 132 (step 1402). NAS controller 634 identifies a subset of the NAS protocol IEs that are designated for security-related handling (step 1404). NAS controller 634 formats or generates a first NAS message for the NAS procedure, such as a registration request of type "mobility", "periodic", etc. NAS controller 634 includes or inserts the subset of NAS protocol IEs in the first NAS message (step 1406).

NAS controller 634 also formats or generates a second NAS message that is a duplicate of the first NAS message. NAS controller 634 includes or inserts the NAS protocol IEs for the NAS procedure in the second NAS message (step 1408). In this step, the second NAS message includes the entire set of NAS protocol IEs for the NAS procedure (mandatory and optional (if desired)). Because the second NAS message includes each of the mandatory NAS protocol IEs for the NAS procedure, the second NAS message is considered a "complete" NAS message.

NAS controller 634 includes or inserts the second NAS message in a NAS message container of the first NAS message (step 1410). NAS controller 634 encrypts the NAS message container of the first NAS message using a NAS security algorithm of the NAS security context (step 1412). Thus, the complete second NAS message is encrypted in the NAS message container of the first NAS message. NAS controller 634 then sends the first NAS message to network element 132 (step 1414).

Figure 15:
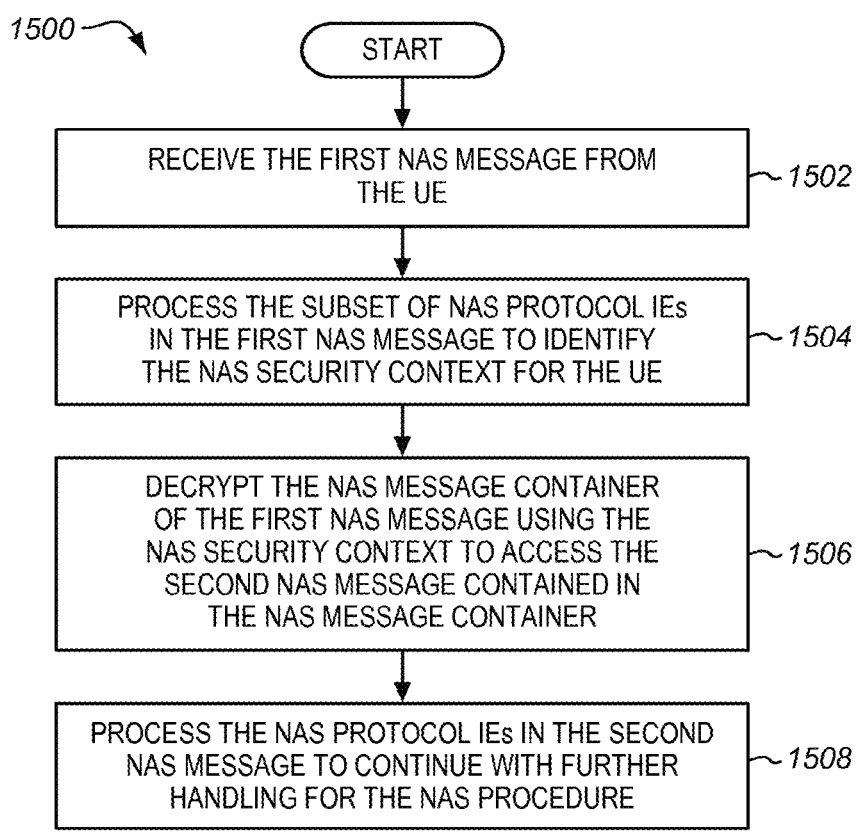
FIG. 15 is a flow chart illustrating a method of performing a NAS procedure in a network element in another illustrative embodiment.

FIG. 15 is a flow chart illustrating a method 1500 of performing a NAS procedure in a network element 132 in an illustrative embodiment. Network interface component 702 of network element 132 receives the first NAS message from UE 110 (step 1502). Security manager 704 processes the subset of NAS protocol IEs in the first NAS message to identify the NAS security context for UE 110 (step 1504). Security manager 704 then decrypts the NAS message container of the first NAS message using the NAS security context to access the second NAS message contained in the NAS message container (step 1506). With the NAS message container in the first NAS message decrypted, security manager 704 has access to the second NAS message as decrypted. The second NAS message is populated with the NAS protocol IEs for the NAS procedure. Thus, security manager 704 may process the NAS protocol IEs in the second NAS message to continue with further handling for the NAS procedure (step 1508). One technical benefit of this process is that only the NAS protocol IEs that are needed to identify the NAS security context are sent as unencrypted in the first NAS message, while the complete second NAS message is encrypted in the first NAS message, which provides further security protection.

Figure 16:
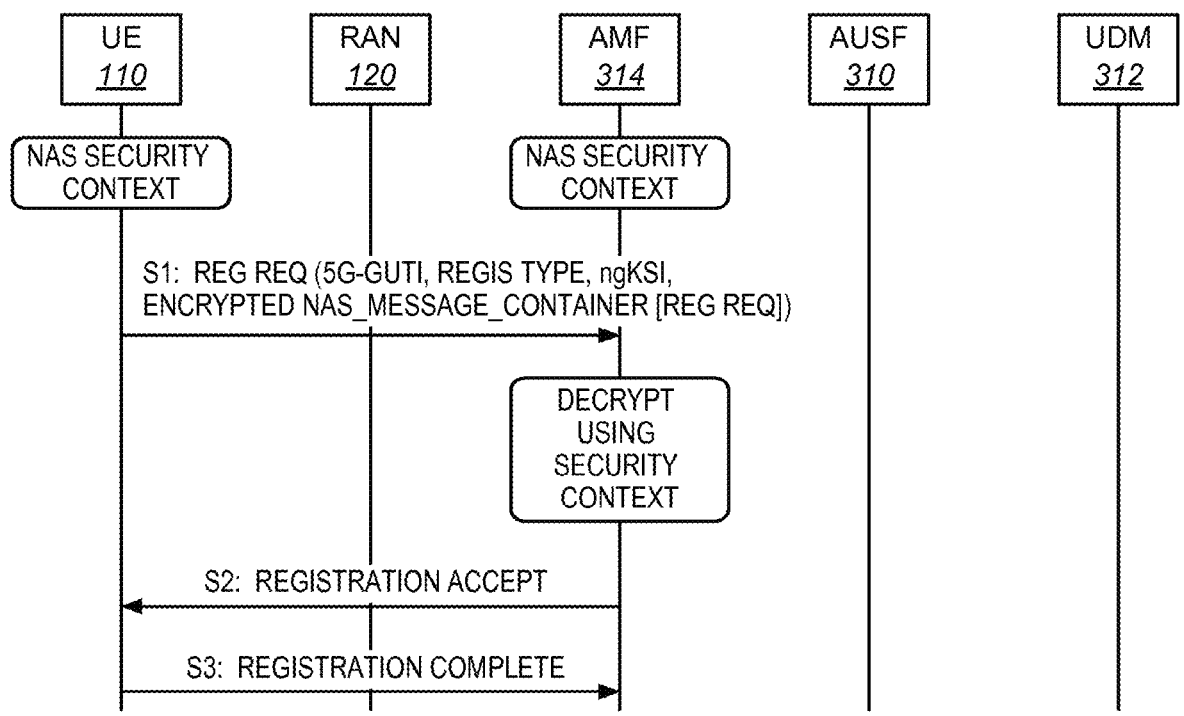
FIG. 16 is a message diagram showing a NAS registration procedure when a UE has a valid security context in an illustrative embodiment.

FIG. 16 is a message diagram showing a NAS registration procedure when a UE has a valid security context in an illustrative embodiment. UE 110 generates or formats a first registration request for a NAS registration procedure. In this embodiment, UE 110 populates the first registration request with a subset of NAS protocol IEs that are designated for security-related handling. This information is used to indicate a NAS security context to AMF element 314. For example, the subset of NAS protocol IEs may include a 5G-GUTI, a registration type, and an ngKSI. UE 110 also formats or generates a second registration request that is a duplicate of the first registration request. UE 110 includes or inserts the NAS protocol IEs for the NAS registration procedure in the second registration request. In this step, the second registration request includes the entire set of NAS protocol IEs for the NAS registration procedure (mandatory and optional (if desired)). Because the second registration request includes each of the mandatory NAS protocol IEs for the NAS registration procedure, the second registration request is considered a "complete" registration request.

UE 110 includes or inserts the second registration request in a NAS message container of the first registration request, and encrypts the NAS message container of the first registration request using a NAS security algorithm of the NAS security context. Thus, the complete second registration request is encrypted in the NAS message container of the first registration request. UE 110 then sends the first registration request to AMF element 314 (S1).

In response to receiving the first registration request. AMF element 314 identifies or retrieves the NAS security context based on the subset of NAS protocol IEs included in the first registration request. AMF element 314 then decrypts the encrypted NAS message container of the first registration request using the NAS security context so that the second registration request is readable. AMF element 314 is therefore able to process the entire set of NAS protocol IEs for the NAS registration procedure, and continue handling for the NAS registration procedure. For instance. AMF element 314 sends a registration accept message to UE 110 (S2). UE 110 replies to AMF element 314 with a registration complete message (S3), at which point UE 110 is registered with the network to access services.

Figure 17:
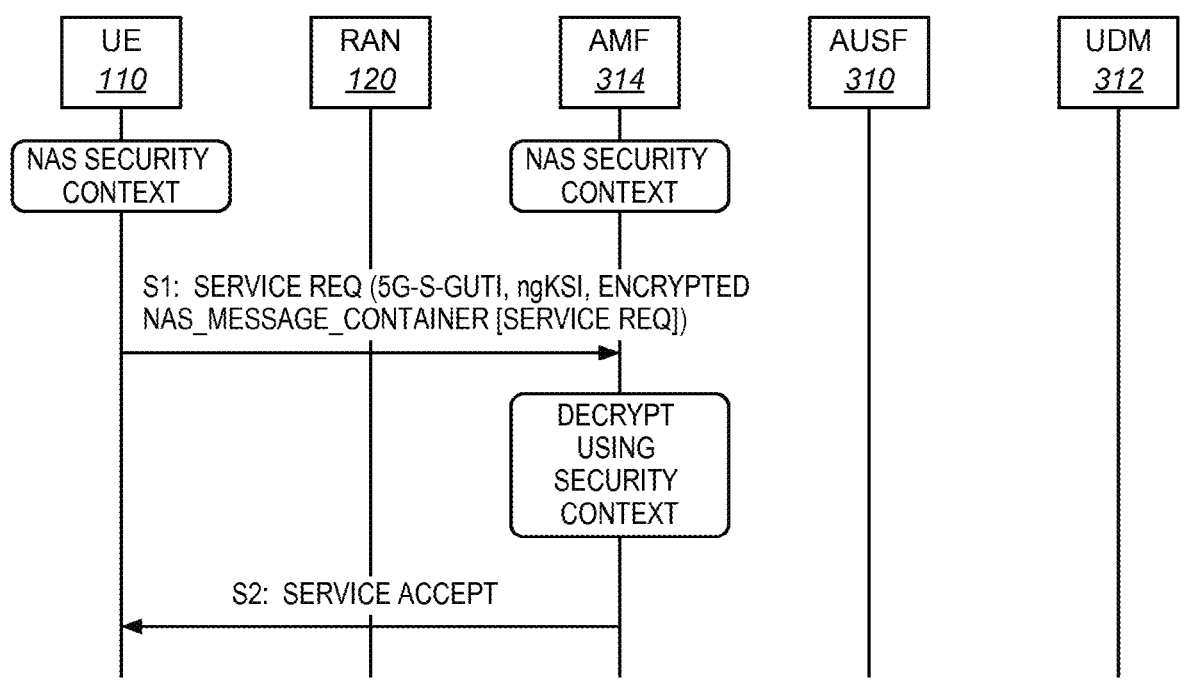
FIG. 17 is a message diagram showing a NAS service request procedure when a UE has a valid security context in an illustrative embodiment.

FIG. 17 is a message diagram showing a NAS service request procedure when a UE has a valid security context in an illustrative embodiment. UE 110 generates or formats a first service request for the NAS service request procedure. In this embodiment, UE 110 populates the first service request with a subset of NAS protocol IEs that are designated for security-related handling, which is used to indicate a NAS security context to AMF element 314. In this example, the subset of NAS protocol IEs may include a 5G-S-TMSI and an ngKSI. UE 110 also formats or generates a second service request that is a duplicate of the first service request. UE 110 includes or inserts the NAS protocol IEs for the NAS service request procedure in the second service request. In this step, the second service request includes the entire set of NAS protocol IEs for the NAS service request procedure (mandatory and optional (if desired)). Because the second service request includes each of the mandatory NAS protocol IEs for the NAS service request procedure, the second service request is considered a "complete" service request.

UE 110 includes or inserts the second service request in a NAS message container of the first service request, and encrypts the NAS message container of the first service request using a NAS security algorithm of the NAS security context. Thus, the complete second service request is encrypted in the NAS message container of the first service request. UE 110 then sends the first service request to AMF element 314 (S1).

In response to receiving the first service request, AMF element 314 identifies or retrieves the NAS security context based on the subset of NAS protocol IEs included in the first service request. AMF element 314 then decrypts the encrypted NAS message container of the first service request using the NAS security context so that the second service request is readable. AMF element 314 is therefore able to process the entire set of NAS protocol IEs for the NAS service request procedure, and continue handling for the NAS service request procedure. For instance. AMF element 314 sends a service accept message to UE 110 (S2).

Figure 18:
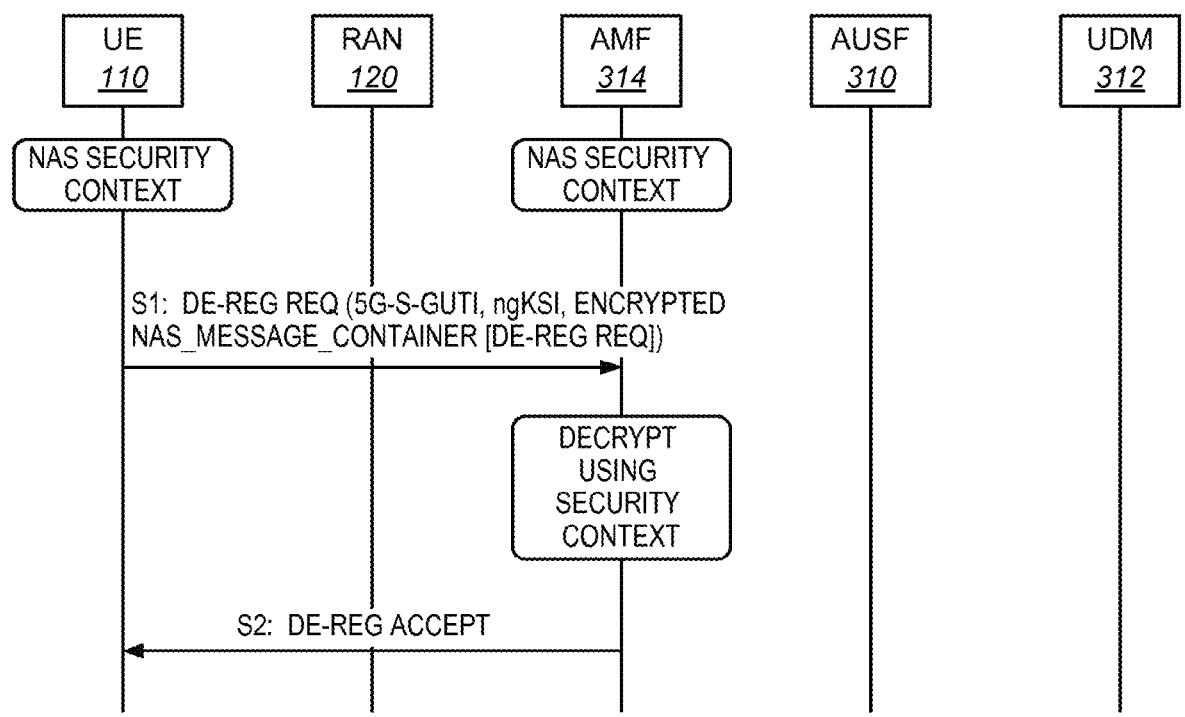
FIG. 18 is a message diagram showing a NAS de-registration procedure when a UE has a valid security context in an illustrative embodiment.

FIG. 18 is a message diagram showing a NAS de-registration procedure when a UE has a valid security context in an illustrative embodiment. UE 110 generates or formats a first de-registration request for the NAS de-registration procedure. In this embodiment, UE 110 populates the first de-registration request with a subset of NAS protocol IEs that are designated for security-related handling, which is used to indicate a NAS security context to AMF element 314. In this example, the subset of NAS protocol IEs may include a 5G-S-TMSI and an ngKSI. UE 110 also formats or generates a second de-registration request that is a duplicate of the first de-registration request. UE 110 includes or inserts the NAS protocol IEs for the NAS de-registration procedure in the second de-registration request. In this step, the second de-registration request includes the entire set of NAS protocol IEs for the NAS de-registration procedure (mandatory and optional (if desired)). Because the second de-registration request includes each of the mandatory NAS protocol IEs for the NAS de-registration procedure, the second de-registration request is considered a "complete" de-registration request.

UE 110 includes or inserts the second de-registration request in a NAS message container of the first de-registration request, and encrypts the NAS message container of the first de-registration request using a NAS security algorithm of the NAS security context. Thus, the complete second de-registration request is encrypted in the NAS message container of the first de-registration request. UE 110 then sends the first de-registration request to AMF element 314 (S1).

In response to receiving the first de-registration request, AMF element 314 identifies or retrieves the NAS security context based on the subset of NAS protocol IEs included in the first de-registration request. AMF element 314 then decrypts the encrypted NAS message container of the first de-registration request using the NAS security context so that the second de-registration request is readable. AMF element 314 is therefore able to process the entire set of NAS protocol IEs for the NAS de-registration procedure, and continue handling for the NAS de-registration procedure. For instance. AMF element 314 sends a de-registration accept message to UE 110 (S2).

Example 4

Security Context Exists-Security Context is Invalid or Not Found

Figure 19A:
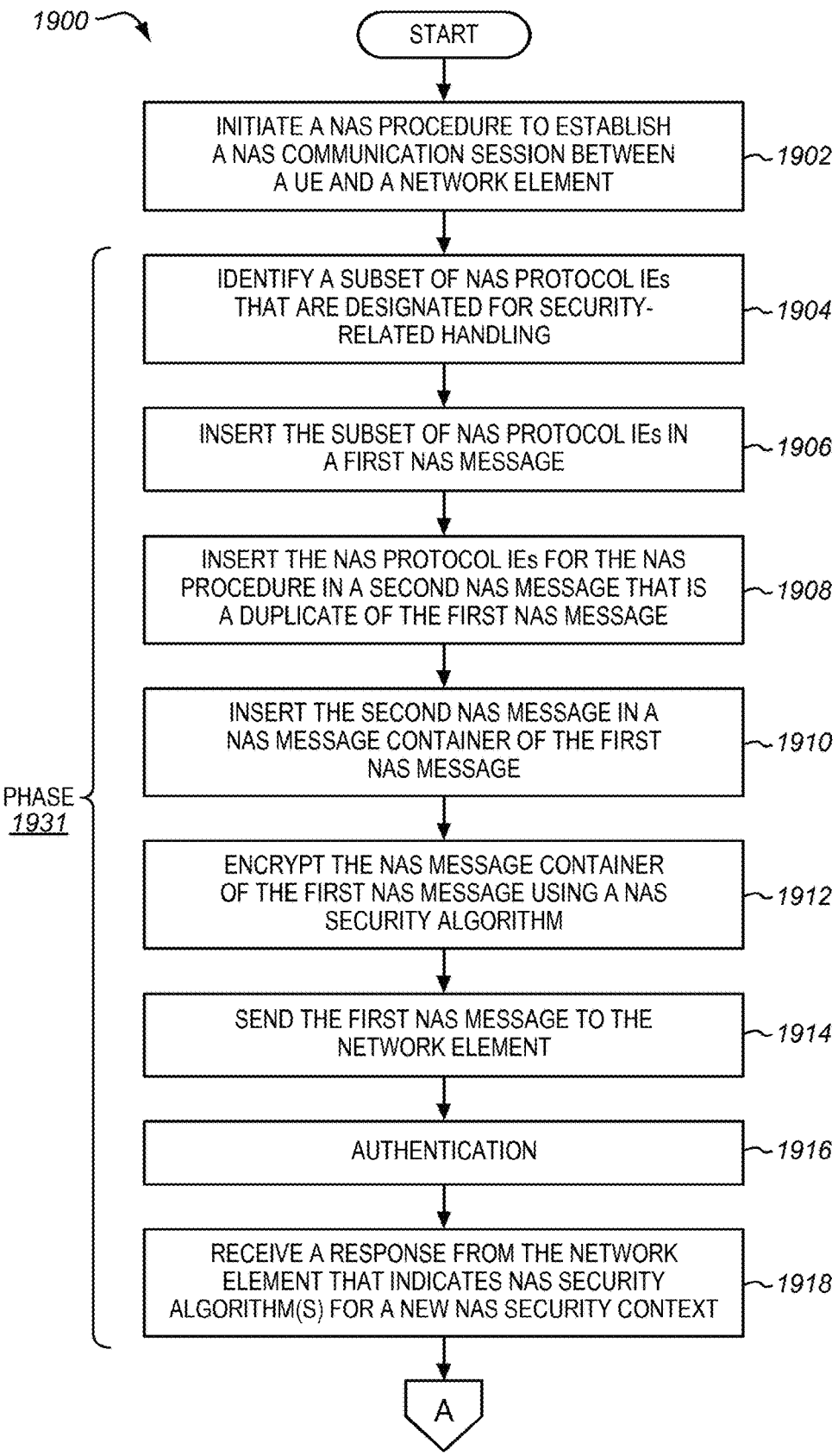
FIGS. 19A-19B illustrate a flow chart illustrating a method of performing a NAS procedure in a UE in an illustrative embodiment.
Figure 19B:
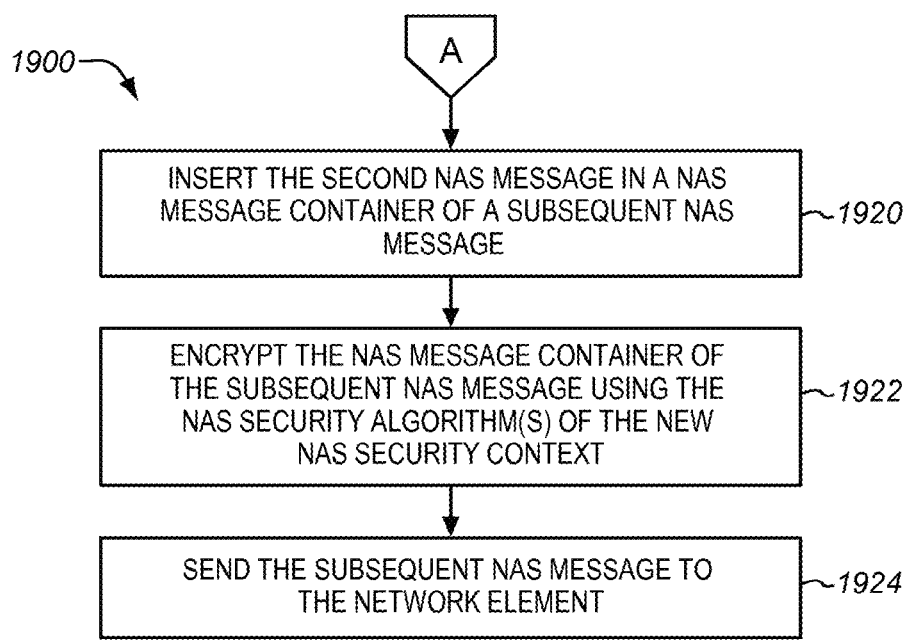

FIGS. 19A-19B are a flow chart illustrating a method 1900 of performing a NAS procedure in UE 110 in an illustrative embodiment. NAS controller 634 in UE 110 initiates a NAS procedure to establish (or re-establish) a NAS communication session between UE 110 and network element 132 (step 1902). For the first phase 1931 of the NAS procedure, NAS controller 634 identifies a subset of the NAS protocol IEs that are designated for security-related handling (step 1904). NAS controller 634 formats or generates a first NAS message for the NAS procedure, and includes or inserts the subset of NAS protocol IEs in the first NAS message (step 1906).

NAS controller 634 also formats or generates a second NAS message that is a duplicate of the first NAS message. NAS controller 634 includes or inserts the NAS protocol IEs for the NAS procedure in the second NAS message (step 1908). In this step, the second NAS message includes the entire set of NAS protocol IEs for the NAS procedure (mandatory and optional (if desired)). Because the second NAS message includes each of the mandatory NAS protocol IEs for the NAS procedure, the second NAS message is considered a "complete" NAS message.

NAS controller 634 includes or inserts the second NAS message in a NAS message container of the first NAS message (step 1910). NAS controller 634 encrypts the NAS message container of the first NAS message using a NAS security algorithm of the NAS security context (step 1912). Thus, the complete second NAS message is encrypted in the NAS message container of the first NAS message. NAS controller 634 then sends the first NAS message to network element 132 (step 1914).

Figure 20:
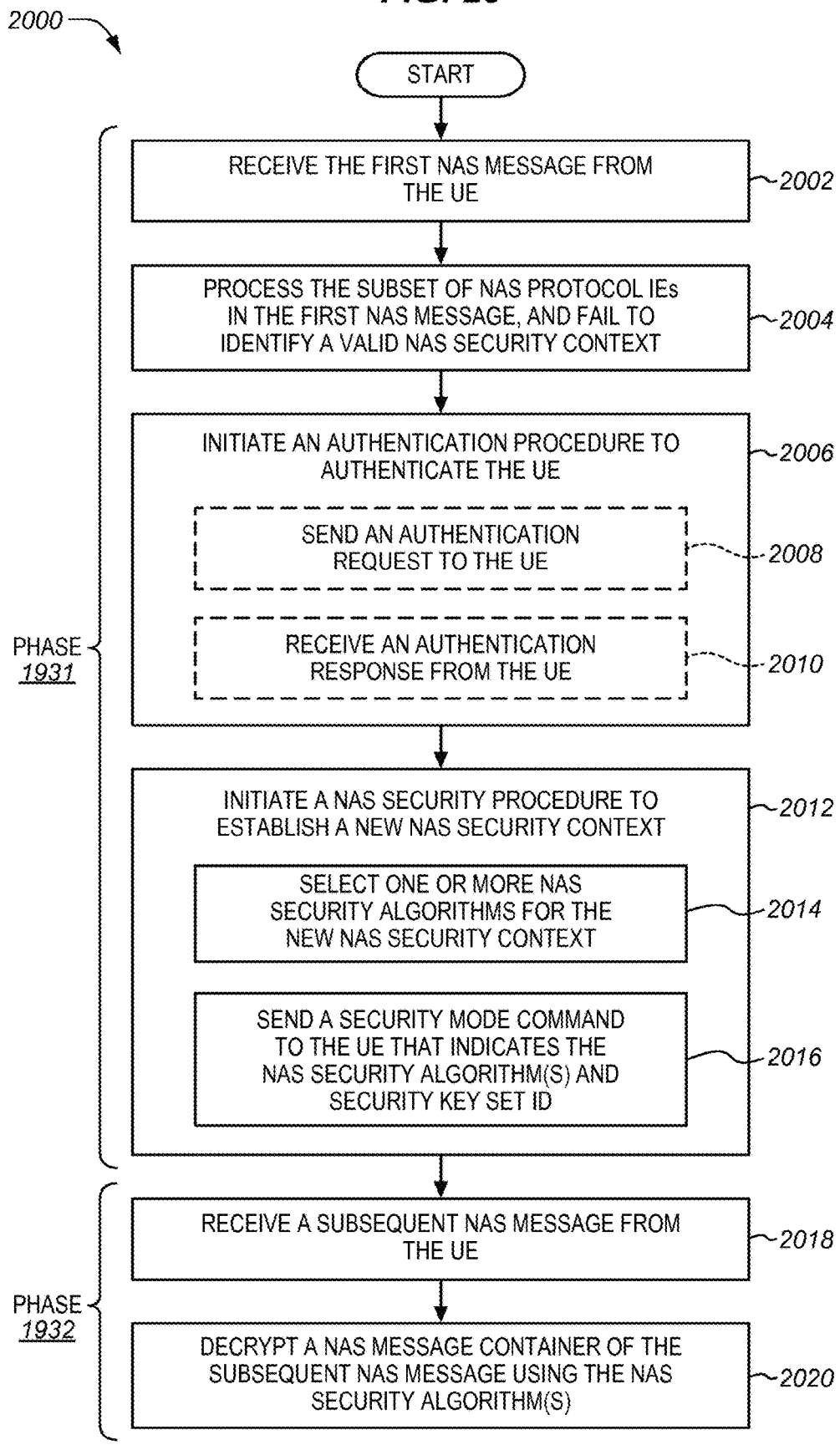
FIG. 20 is a flow chart illustrating a method of performing a NAS procedure in a network element in an illustrative embodiment.

FIG. 20 is a flow chart illustrating a method 2000 of performing a NAS procedure in a network element 132 in an illustrative embodiment. For the first phase 1931 of the NAS procedure, network interface component 702 of network element 132 receives the first NAS message from UE 110 (step 2002). Security manager 704 processes the subset of NAS protocol IEs in the first NAS message, and fails to identify a valid NAS security context for UE 110 (step 2004). For example, even though a NAS security context exists, security manager 704 may not be able to identify the NAS security context based on the subset of NAS protocol IEs provided in the first NAS message, the NAS security context identified based on the subset of NAS protocol IEs is invalid, etc. Because a valid NAS security context is not found, security manager 704 initiates an authentication procedure to authenticate UE 110 (step 2006). Even though the authentication procedure may have been performed previously, security manager 704 performs an authentication procedure again when no valid NAS security context is found. As part of the authentication procedure, security manager 704 may send an authentication request to UE 110 along with an authentication token (optional step 2008) through network interface component 702. In response to the authentication request, UE 110 attempts to validate the authentication token (see step 1916 of FIG. 19A). If successful, UE 110 considers mobile network 100 to be authenticated. UE 110 computes a response token, and sends an authentication response with the response token, which is received by security manager 704 (optional step 2010) through network interface component 702. Security manager 704 (or another network element) may then determine whether the response token is valid (e.g., compare the response token with an expected response token). If the response token is valid, then security manager 704 considers UE 110 authenticated.

With UE 110 validated, security manager 704 initiates a NAS security procedure to establish a new NAS security context (step 2012). For the NAS security procedure, security manager 704 selects one or more NAS security algorithms for the new NAS security procedure (step 2014), and derives one or more NAS security keys. Security manager 704 then sends a response to UE 110 that indicates or includes the NAS security algorithm(s) and a security key set identifier selected for the new NAS security context (step 2016) through network interface component 702. The response may comprise a Security Mode Command that includes the NAS security algorithm(s), a security key set identifier (e.g., ngKSI, eKSI, etc.), and other information.

In FIG. 19A, NAS controller 634 receives the response from network element 132 that indicates the NAS security algorithm(s) and security key set identifier (step 1918). With the information provided in the response from network element 132, the new NAS security context is established between UE 110 and network element 132. Thus, subsequent NAS messages between UE 110 and network element 132 may be secured using the new NAS security context.

For the second phase 1932 of the NAS procedure in FIG. 19B, NAS controller 634 of UE 110 may then format or generate a subsequent NAS message for the NAS procedure. For example, the subsequent NAS message may comprise a Security Mode Complete message. NAS controller 634 includes or inserts the second NAS message for the NAS procedure in a NAS message container of the subsequent NAS message (step 1920). As described above, the second NAS message includes the entire set of NAS protocol IEs for the NAS procedure (mandatory and optional (if desired)), and is considered a "complete" NAS message. NAS controller 634 encrypts the NAS message container of the subsequent NAS message using the NAS security algorithm(s) (step 1922) of the new NAS security context. NAS controller 634 then sends the subsequent NAS message to network element 132 (step 1924).

In FIG. 20, for the second phase 1932, network interface component 702 receives the subsequent NAS message from UE 110 (step 2018). Security manager 704 decrypts the NAS message container of the subsequent NAS message using the NAS security algorithm(s) (step 2020) of the new NAS security context to access the complete second NAS message. Security manager 704 or other subsystems of network element 132 may then process the NAS protocol IEs from the complete second NAS message to provide further handling for the NAS procedure. One technical benefit of this process is that only the NAS protocol IEs that are needed to identify the NAS security context are sent as unencrypted in the first NAS message. When a valid NAS security context is not found, a new NAS security context is established and a complete NAS message is encrypted in a subsequent NAS message according to the new NAS security context, which provides further security protection.

Figure 21:
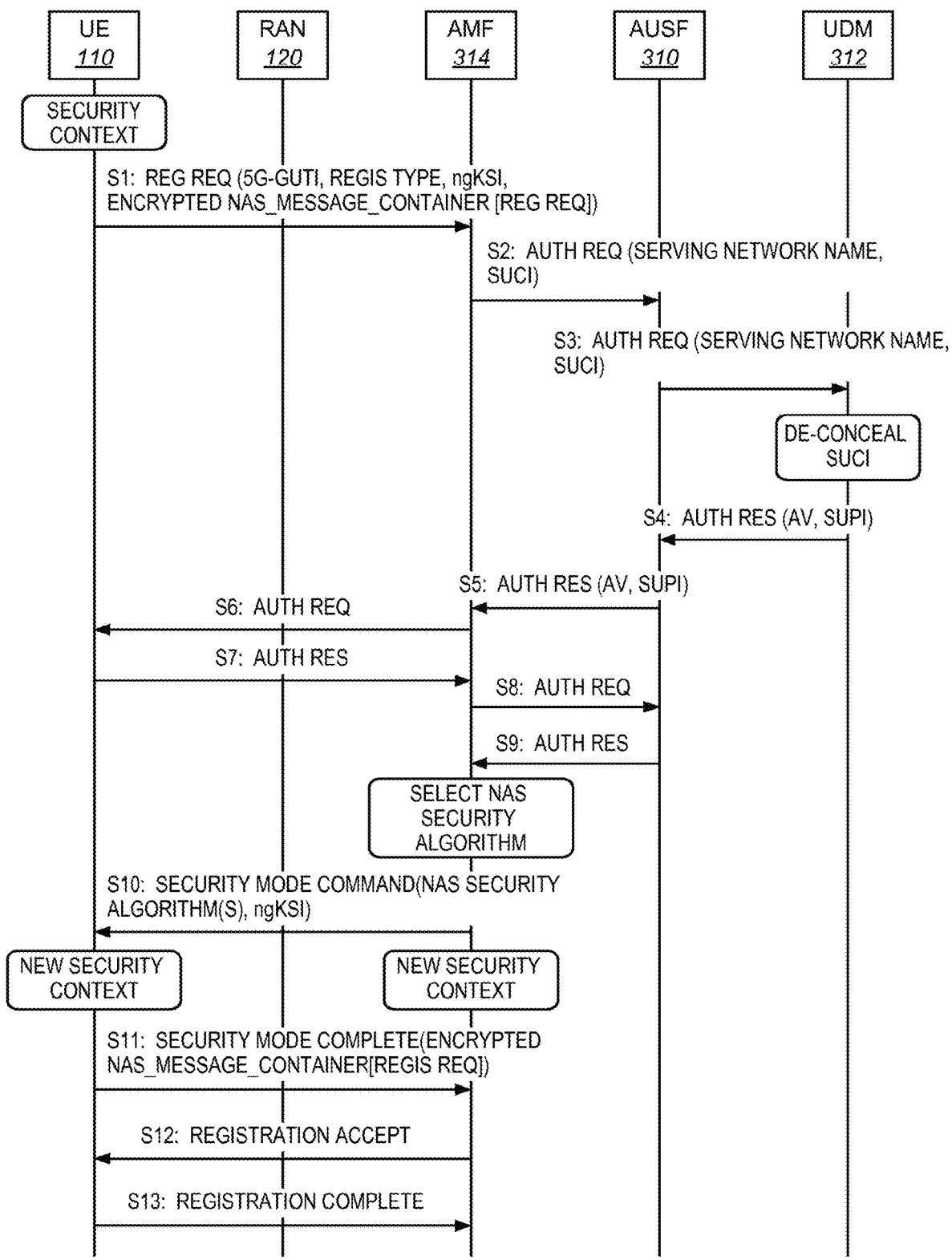
FIG. 21 is a message diagram showing a NAS registration procedure when a UE has a NAS security context but the NAS security context is not valid or is not found in an illustrative embodiment.

FIG. 21 is a message diagram showing a NAS registration procedure when a UE has a NAS security context but the NAS security context is not valid or is not found in an illustrative embodiment. For the first phase of the NAS procedure, UE 110 generates or formats a first registration request for a NAS registration procedure. In this embodiment, UE 110 populates the first registration request with a subset of NAS protocol IEs that are designated for security-related handling. This information is used to indicate the NAS security context to AMF element 314. For example, the subset of NAS protocol IEs may include a 5G-GUTI, a registration type, and an ngKSI. UE 110 also formats or generates a second registration request that is a duplicate of the first registration request. UE 110 includes or inserts the NAS protocol IEs for the NAS registration procedure in the second registration request. In this step, the second registration request includes the entire set of NAS protocol IEs for the NAS registration procedure (mandatory and optional (if desired)). Because the second registration request includes each of the mandatory NAS protocol IEs for the NAS registration procedure, the second registration request is considered a "complete" registration request.

UE 110 includes or inserts the second registration request in a NAS message container of the first registration request, and encrypts the NAS message container of the first registration request using a NAS security algorithm of the NAS security context. Thus, the complete second registration request is encrypted in the NAS message container of the first registration request. UE 110 then sends the first registration request to AMF element 314 (S1).

In response to receiving the first registration request, AMF element 314 attempts to identify or retrieve the NAS security context based on the subset of NAS protocol IEs included in the first registration request. In this example, AMF element 314 is not able to identify a valid NAS security context for UE 110. Thus, AMF element 314 is unable to decrypt the NAS message container of the first registration request. To allow for secure communications, AMF element 314 initiates a new authentication procedure to create a new NAS security context. AMF element 314 formats or generates an authentication request (i.e., Nausf UEAuthentication_Authenticate Request), and sends the authentication request to AUSF element 310 (S2). In response to receiving the authentication request, AUSF element 310 formats or generates an authentication request (i.e., Nudm_UEAuthentication_Get Request), and sends the authentication request to UDM element 312 (S3).

In response to the authentication request, UDM element 312 de-conceals the SUCI, and sends an authentication response (i.e., Nudm_UEAuthentication_Get Response) to AUSF element 310 (S4). In response to receiving the authentication response, AUSF element 310 formats or generates an authentication response (i.e., Nuasf_UEAuthentication_Authenticate Response) for AMF element 314, and sends the authentication response to AMF element 314 (S5).

AMF element 314 is configured to perform an authentication procedure with UE 110 using information provided by UDM/AUSF. For example, AMF element 314 sends an authentication request to UE 110 along with an authentication token (S6), and UE 110 attempts to validate the authentication token. If successful, UE 110 computes a response token, and sends an authentication response with the response token, which is received by AMF element 314 (S7). AMF element 314 formats or generates another authentication request (i.e., Nausf_UEAuthentication_Authenticate Request), and inserts the response token from UE 110 in the authentication request, along with other information. AMF element 314 then sends the authentication request to AUSF element 310 (S8). AUSF element 310 verifies whether the response token from UE 110 matches an expected response token, and sends an authentication response (i.e., Nausf_UEAuthentication_Authenticate Response) to AMF element 314 indicating success/failure of the authentication.

When UE 110 is authenticated to the network, AMF element 314 initiates a NAS security procedure to establish the new NAS security context. AMF element 314 selects a NAS security algorithm (or multiple algorithms) for ciphering and integrity protection. AMF element 314 formats or generates a Security Mode Command message, and inserts an indicator of the NAS security algorithm, the ngKSI, and other information in the Security Mode Command message. AMF element 314 then sends the Security Mode Command message to UE 110 (S10).

For the second phase of the NAS procedure, UE 110 uses the ngKSI and NAS security algorithm to derive corresponding keys for protecting subsequent NAS messages. A new NAS security context is therefore established between UE 110 and AMF element 314. UE 110 formats or generates a Security Mode Complete message, and inserts the second registration request in a NAS message container of the Security Mode Complete message. As described above, the second registration request includes the entire set of NAS protocol IEs for the NAS registration procedure (mandatory and optional (if desired)), and is considered a "complete" NAS message. UE 110 encrypts the NAS message container of the Security Mode Complete message using the NAS security algorithm of the new NAS security context. Thus, the second registration request is encrypted in the NAS message container of the Security Mode Complete message. UE 110 then sends the Security Mode Complete message to AMF element 314 (S11).

AMF element 314 receives the Security Mode Complete message from UE 110, and decrypts the NAS message container of the Security Mode Complete message to access the NAS protocol IEs from the second registration request. AMF element 314 then continues with the NAS registration procedure, such as by sending a registration accept message to UE 110 (S12). UE 110 replies to AMF element 314 with a registration complete message (S13), at which point UE 110 is registered with the network to access services.

Figure 22:
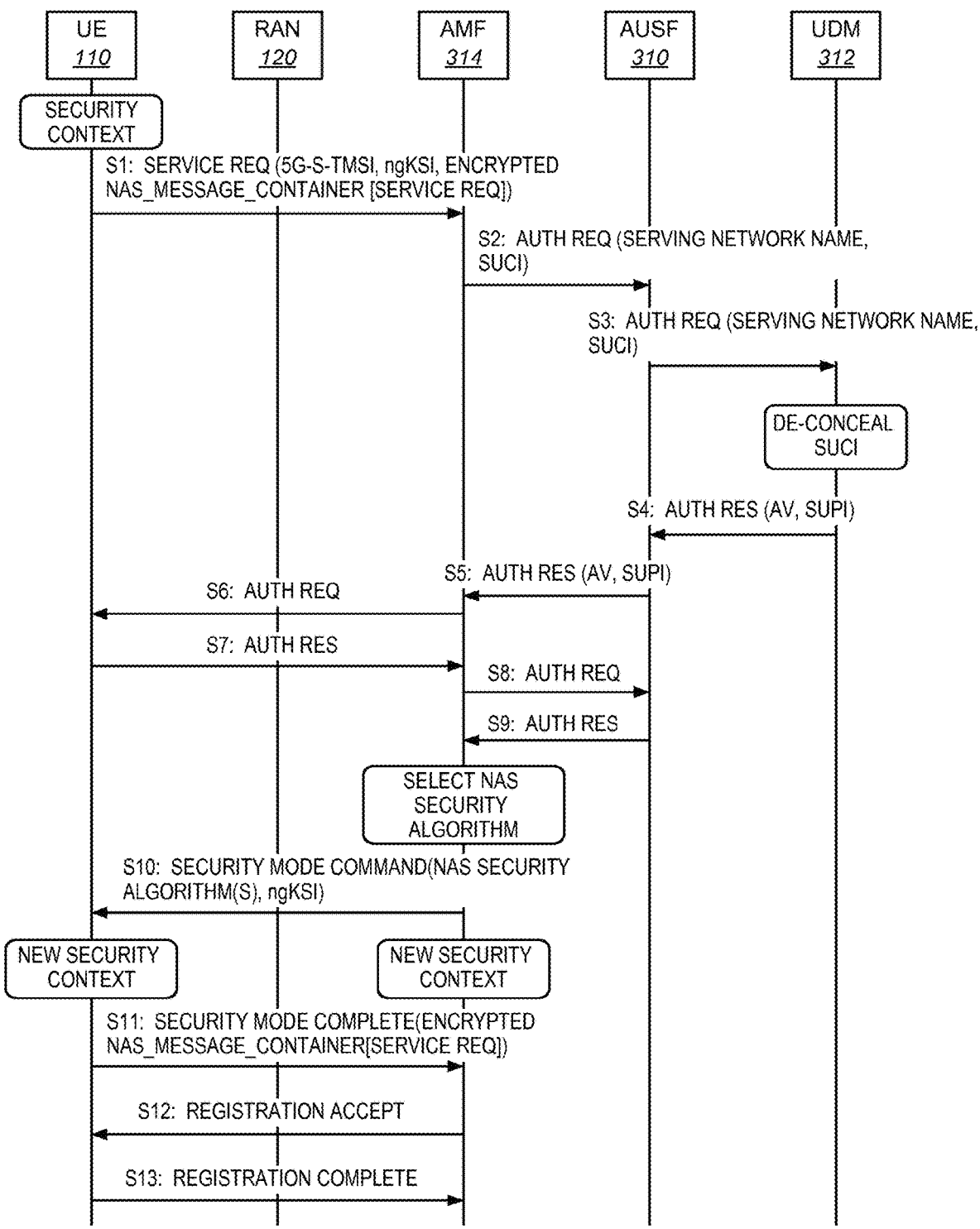
FIG. 22 is a message diagram showing a NAS service request procedure when a UE has a NAS security context but the NAS security context is not valid or is not found in an illustrative embodiment.

FIG. 22 is a message diagram showing a NAS service request procedure when a UE has a NAS security context but the NAS security context is not valid or is not found in an illustrative embodiment. For the first phase of the NAS procedure. UE 110 generates or formats a first service request for a NAS service request procedure. In this embodiment, UE 110 populates the first service request with a subset of NAS protocol IEs that are designated for security-related handling. This information is used to indicate the NAS security context to AMF element 314. For example, the subset of NAS protocol IEs may include a 5G-S-TMSI and an ngKSI. UE 110 also formats or generates a second service request that is a duplicate of the first service request. UE 110 includes or inserts the NAS protocol IEs for the NAS service request procedure in the second service request. In this step, the second service request includes the entire set of NAS protocol IEs for the NAS service request procedure (mandatory and optional (if desired)). Because the second service request includes each of the mandatory NAS protocol IEs for the NAS service request procedure, the second service request is considered a "complete" service request.

UE 110 includes or inserts the second service request in a NAS message container of the first service request, and encrypts the NAS message container of the first service request using a NAS security algorithm of the NAS security context. Thus, the complete second service request is encrypted in the NAS message container of the first service request. UE 110 then sends the first service request to AMF element 314 (S1).

In response to receiving the first service request, AMF element 314 attempts to identify or retrieve the NAS security context based on the subset of NAS protocol IEs included in the first service request. In this example, AMF element 314 is not able to identify a valid NAS security context for UE 110. Thus, AMF element 314 is unable to decrypt the NAS message container of the first service request. To allow for secure communications, AMF element 314 initiates a new authentication procedure to create a new NAS security context. AMF element 314 formats or generates an authentication request (i.e., Nausf UEAuthentication Authenticate Request), and sends the authentication request to AUSF element 310 (S2. In response to receiving the authentication request. AUSF element 310 formats or generates an authentication request (i.e., Nudm_UEAuthentication_Get Request), and sends the authentication request to UDM element 312 (S3).

In response to the authentication request, UDM element 312 de-conceals the SUCI, and sends an authentication response (i.e., Nudm_UEAuthentication_Get Response) to AUSF element 310 (S4). In response to receiving the authentication response, AUSF element 310 formats or generates an authentication response (i.e., Nuasf_UEAuthentication_Authenticate Response) for AMF element 314, and sends the authentication response to AMF element 314 (S5).

AMF element 314 is configured to perform an authentication procedure with UE 110 using information provided by UDM/AUSF. For example, AMF element 314 sends an authentication request to UE 110 along with an authentication token (S6), and UE 110 attempts to validate the authentication token. If successful, UE 110 computes a response token, and sends an authentication response with the response token, which is received by AMF element 314 (S7). AMF element 314 formats or generates another authentication request (i.e., Nausf_UEAuthentication_Authenticate Request), and inserts the response token from UE 110 in the authentication request, along with other information. AMF element 314 then sends the authentication request to AUSF element 310 (SM). AUSF element 310 verifies whether the response token from UE 110 matches an expected response token, and sends an authentication response (i.e., Nausf_UEAuthentication_Authenticate Response) to AMF element 314 indicating success/failure of the authentication.

When UE 110 is authenticated to the network, AMF element 314 initiates a NAS security procedure to establish the new NAS security context. AMF element 314 selects a NAS security algorithm (or multiple algorithms) for ciphering and integrity protection. AMF element 314 formats or generates a Security Mode Command message, and inserts an indicator of the NAS security algorithm, the ngKSI, and other information in the Security Mode Command message. AMF element 314 then sends the Security Mode Command message to UE 110 (S10).

For the second phase of the NAS procedure. UE 110 uses the ngKSI and NAS security algorithm to derive corresponding keys for protecting subsequent NAS messages. A new NAS security context is therefore established between UE 110 and AMF element 314. UE 110 formats or generates a Security Mode Complete message, and inserts the second service request in a NAS message container of the Security Mode Complete message. As described above, the second service request includes the entire set of NAS protocol IEs for the NAS service request procedure (mandatory and optional (if desired)), and is considered a "complete" NAS message. UE 110 encrypts the NAS message container of the Security Mode Complete message using the NAS security algorithm of the new NAS security context. Thus, the second service request is encrypted in the NAS message container of the Security Mode Complete message. UE 110 then sends the Security Mode Complete message to AMF element 314 (S11).

AMF element 314 receives the Security Mode Complete message from UE 110, and decrypts the NAS message container of the Security Mode Complete message to access the NAS protocol IEs from the second service request. AMF element 314 then continues with the NAS service request procedure, such as by sending a registration accept message to UE 110 (S12). UE 110 replies to AMF element 314 with a registration complete message (S13).

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:
  (a) hardware-only circuit implementations (such as implementations in only analog and/or digital circuitry);

(b) combinations of hardware circuits and software, such as (as applicable):
   (i) a combination of analog and/or digital hardware circuit(s) with software/firmware; and
   (ii) any portions of hardware processor(s) with software (including digital signal processor(s)), software, and memory (ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

The invention claimed is:

1. A User Equipment (UE) configured for communication in a fifth-generation core network (5GCN), the UE comprising:
   at least one processor; and
   at least one memory storing instructions thereon that, when executed by the at least one processor, cause the UE to perform at least:
      (i) determining whether the UE has a Non-Access Stratum (NAS) security context for communication with an Access and Mobility Management Function (AMF) of the 5GCN;
      (ii) in an instance in which the UE has a NAS security context for communication with the AMF, initiating a NAS registration procedure to establish a NAS communication session between the UE and the AMF of the 5GCN by causing the UE to perform at least:
         identifying, from among a full set of NAS protocol Information Elements (IEs) to be used during initiation of the NAS registration procedure, a subset of NAS protocol IEs that consists only of NAS protocol IEs that are designated for security-related handling during initiation of the NAS procedure to establish the NAS communication session between the UE and the AMF, wherein the subset of NAS protocol IEs comprises an IE that indicates a registration type associated with the NAS registration procedure:
         inserting, in an initial NAS message, the subset of NAS protocol IEs;
         inserting, in a NAS message container within the initial NAS message, the full set of NAS protocol IEs, the full set of NAS protocol IEs including the subset of NAS protocol IEs that consists only of those NAS protocol IEs designated for security-related handling during initiation of the NAS registration procedure to establish the NAS communication session between the UE and the AMF and one or more additional NAS protocol IEs;
         encrypting, using one or more keys associated with the NAS security context, the NAS message container encompassing the full set of NAS protocol IEs; and
         sending the initial NAS message to the AMF, and
      (iii) in an instance in which the UE does not have a NAS security context for communication with the AMF, initiating the NAS registration procedure in multiple phases to establish the NAS communication session between the UE and the AMF of the 5GCN,
   wherein the instructions stored on the at least one memory, when executed by the at least one processor, cause the UE to perform, during a first phase of the NAS registration procedure:
      identifying, from among the full set of NAS protocol IEs used during the NAS registration procedure, the subset of NAS protocol IEs that consists only of those NAS protocol IEs that are designed for security-related handling during initiation of the NAS registration procedure to establish the NAS communication session between the UE and the AMF;
      inserting, in a first initial NAS message, the subset of NAS protocol IEs that consists only of those NAS protocol IEs that are designated for security-related handling during initiation of the NAS registration procedure to establish the NAS communication session between the UE and the AMF;
      sending the first initial NAS message to the AMF; and
      receiving, from the AMF, in response to the first initial NAS message, a NAS security algorithm and a security key set identifier associated with a NAS security context for use by the UE, and
   wherein the instructions stored on the at least one memory, when executed by the at least one processor, cause the UE to perform, during a second phase of the NAS registration procedure:
      inserting, in a second initial NAS message, the full set of NAS protocol IEs for the NAS registration procedure, the full set of NAS protocol IEs including the subset of NAS protocol IEs and one or more additional NAS protocol IEs, the second initial NAS message defining a same message type as the first initial NAS message;
      inserting, in a NAS message container of a subsequent NAS message, the second initial NAS message;
      encrypting the NAS message container of the subsequent NAS message using the NAS security algorithm received from the AMF in response to sending the first initial NAS message to the AMF during the first phase of initiation of the NAS registration procedure; and
      sending the subsequent NAS message to the AMF.

2. The UE of claim 1, wherein the instructions stored on the at least one memory, when executed by the at least one processor, further cause the UE to perform, during the first phase of the NAS registration procedure:
   in an instance in which a public key of a Home Public Land Mobile Network (HPLMN) for the UE is stored locally at the UE, encrypting the subset of the NAS protocol IEs in the first initial NAS message using the public key of; and inserting the subset of the NAS protocol IEs into the first initial NAS message.

3. The UE of claim 1, wherein the instructions stored on the at least one memory, when executed by the at least one processor, further cause the UE to perform, during the first phase of the NAS registration procedure:
in an instance in which a public key is stored locally on a Universal Mobile Telecommunications Service (UMTS) Subscriber Identity Module (USIM) of the UE, encrypting the subset of the NAS protocol IEs in the first initial NAS message using the public key.

4. The UE of claim 1, wherein the instructions stored on the at least one memory, when executed by the at least one processor, further cause the UE to perform:
in an instance in which a public key is not stored locally on a Universal Mobile Telecommunications Service (UMTS) Subscriber Identity Module (USIM) of the UE, refraining from encrypting the subset of the NAS protocol IEs in the first initial NAS message or the initial NAS message.

5. The UE of claim 1, wherein the subset of NAS protocol IEs that consists only of those NAS protocol IEs designated for security-related handling consists of a mobile identity for the UE, a UE security capability indicating one or more NAS security algorithms supported by the UE, and a security key set identifier for a NAS security context.

6. The UE of claim 1, wherein the instructions stored on the at least one memory, when executed by the at least one processor, further cause the UE to perform:
in an instance in which the registration type does not indicate an emergency, encrypting the subset of the NAS protocol IEs in the first initial NAS message using a public key of a Home Public Land Mobile Network (HPLMN) for the UE.

7. The UE of claim 1, wherein the instructions stored on the at least one memory, when executed by the at least one processor, further cause the UE to perform:
in an instance in which the registration type indicates an emergency, sending the first initial NAS message to the AMF without encrypting the subset of NAS protocol IEs in the first initial NAS message.

8. The UE of claim 1, wherein the response comprises a security mode command message that indicates the NAS security algorithm and the security key set identifier.

9. The UE of claim 1, wherein the subsequent NAS message comprises a security mode complete message having the NAS message container that contains the first initial NAS message encrypted therein based on the NAS security algorithm received from the AMF during the first phase of the NAS registration procedure.

10. An Access and Mobility Management Function (AMF) device configured for communications in a fifth-generation core network (5GCN), the AMF device comprising:
at least one processor; and
at least one memory storing instructions thereon that, when executed by the at least one processor, cause the AMF device to perform at least:
(i) in an instance in which a Non-Access Stratum (NAS) security context exists for communication between the AMF device and a user equipment (UE) in the 5GCN, carrying out initiation of a NAS registration procedure to establish a NAS communication session between the UE and the AMF device of the 5GCN by causing the AMF device to perform at least:
receiving, from the UE, an initial NAS message comprising a subset of NAS protocol Information Elements (IEs) from among a full set of NAS protocol IEs to be used during initiation of the NAS registration procedure, the subset of NAS protocol IEs consisting only of NAS protocol IEs that are designated for security-related handling during the NAS registration procedure, the initial NAS message further comprising a NAS message container encompassing the full set of NAS protocol IEs, including the subset of NAS protocol IEs that are designated for security-related handling during the NAS registration procedure and one or more additional NAS protocol IEs, the NAS message container in the initial NAS message being encrypted using one or more keys associated with the NAS security context, wherein the subset of NAS protocol IEs comprises an IE that indicates a registration type associated with the NAS registration procedure;
establishing, based at least upon the subset of NAS protocol IEs that are designated for security-related handling during the NAS registration procedure, a new NAS security context for communication between the AMF device and the UE in the 5GCN;
generating a new NAS security algorithm and a new NAS security key set identifier associated with the new NAS security context; and
sending, to the UE, the new NAS security algorithm and the new NAS security key set identifier associated with the new NAS security context, and
(ii) in an instance in which a NAS security context does not exist for communication between the AMF device and the UE in the 5GCN, carrying out initiation of the NAS registration procedure in multiple phases to establish the NAS communication session between the UE and the AMF device,
wherein the instructions stored on the at least one memory, when executed by the at least one processor, cause the AMF device to perform at least, during a first phase of the NAS registration procedure:
receiving, from the UE, a first initial NAS message including the subset of NAS protocol IEs selected from among the full set of NAS protocol IEs to be used during initiation of the NAS registration procedure, the subset of NAS protocol IEs consisting only of those NAS protocol IEs that are designated for security-related handling during initiation of the NAS registration procedure to establish the NAS communication session between the UE and the AMF device;
establishing a NAS security context for use by the UE in communication with the 5GCN; and
in response to the first initial NAS message, sending, to the UE, a NAS security algorithm and a security key set identifier associated with the NAS security context for use by the UE in communication with the 5GCN, and
wherein the instructions stored on the at least one memory, when executed by the at least one processor, further cause the AMF device to perform, during a second phase of the NAS registration procedure:
receiving, from the UE, a subsequent NAS message, the subsequent NAS message including a second initial NAS message encapsulated within a NAS message container in the subsequent NAS message, the second initial NAS message defining a same message type as the first initial NAS message, the second initial NAS message comprising the full set of NAS protocol IEs including the subset of NAS protocol IEs that consists only of those NAS protocol IEs designated for security-related handling and one or more additional NAS protocol IEs, wherein the NAS message container of the subsequent NAS message is encrypted using the NAS security algorithm provided to the UE by the AMF device during the first phase of the NAS registration procedure.

11. The AMF device of claim 10, wherein the subset of the NAS protocol IEs received in the first initial NAS message are encrypted by the UE using a public key of a Home Public Land Mobile Network (HPLMN) for the UE.

12. The AMF device of claim 11, wherein the first initial NAS message comprises a registration request message.

13. The AMF device of claim 11, wherein the subset of NAS protocol IEs designated for security-related handling consists of a mobile identity for the UE, a UE security capability indicating one or more NAS security algorithms supported by the UE, and a security key set identifier for a NAS security context.

14. The AMF device of claim 10, wherein the NAS security algorithm and the security key set identifier associated with the NAS security context established by the AMF device are provided to the UE in a security mode command message.

15. The AMF device of claim 10, wherein the subsequent NAS message comprises a security mode complete message having the NAS message container that contains the second initial NAS message.

16. A method comprising:
(i) determining, using a user equipment (UE), whether the UE has a Non-Access Stratum (NAS) security context for communication with an Access and Mobility Management Function (AMF) of fifth-generation core network (5GCN);
(ii) in an instance in which the UE has a NAS security context for communication with the AMF, initiating a NAS registration procedure to establish a NAS communication session between the UE and the AMF of the 5GCN by causing the UE to perform at least:
identifying, from among a full set of NAS protocol Information Elements (IEs) to be used during initiation of the NAS registration procedure, a subset of NAS protocol IEs that consists only of NAS protocol IEs that are designated for security-related handling during initiation of the NAS registration procedure to establish the NAS communication session between the UE and the AMF, wherein the subset of NAS protocol IEs comprises an IE that indicates a registration type associated with the NAS registration procedure;
inserting, in an initial NAS message, the subset of NAS protocol IEs;
inserting, in a NAS message container of the initial NAS message, the full set of NAS protocol IEs, including those NAS protocol IEs that are designated for security-related handling during initiation of the NAS registration procedure to establish the NAS communication session between the UE and the AMF and one or more additional NAS protocol IEs;
encrypting, using one or more keys associated with the NAS security context, the NAS message container in the initial NAS message; and
sending the initial NAS message to the AMF,
(iii) in an instance in which the UE does not have a NAS security context for communication with the AMF, initiating the NAS registration procedure in multiple phases to establish the NAS communication session between the UE and the AMF of the 5GCN,
wherein, during a first phase of the NAS registration procedure, said initiating comprises:
identifying, from among the full set of NAS protocol IEs used during the NAS procedure, the subset of NAS protocol IEs that include only those NAS protocol IEs that are designed for security-related handling during initiation of the NAS registration procedure to establish the NAS communication session between the UE and the AMF;
inserting the subset of NAS protocol IEs that are designated for security-related handling in a first initial NAS message;
sending the first initial NAS message to the AMF; and
receiving, from the AMF, in response to the first initial NAS message, a NAS security algorithm and a security key set identifier associated with a NAS security context for use by the UE during communication with the 5GCN, and
wherein, during a second phase of the NAS registration procedure, said initiating comprises:
inserting, in a second initial NAS message, the full set of NAS protocol IEs for the NAS registration procedure, including the subset of NAS protocol IEs that are designated for security-related handling and one or more additional NAS protocol IEs, the second initial NAS message defining a same message type as the first initial NAS message;
inserting the second initial NAS message in a NAS message container of a subsequent NAS message;
encrypting the NAS message container of the subsequent NAS message using the NAS security algorithm received in response to the first initial NAS message during the first phase of the NAS registration procedure; and
sending the subsequent NAS message to the AMF.

17. The method of claim 16, further comprising:
during the first phase of the NAS registration procedure, encrypting the subset of NAS protocol IEs designated for security-related handling using a public key of a Home Public Land Mobile Network (HPLMN) for the UE.

18. The method of claim 16, further comprising:
in an instance in which a public key of a Home Public Land Mobile Network (HPLMN) for the UE is programmed on a Universal Mobile Telecommunications System (UMTS) Subscriber Identity Module (USIM) of the UE, encrypting the subset of NAS protocol IEs in the first initial NAS message.

19. The method of claim 16, further comprising:
in an instance in which a public key of a Home Public Land Mobile Network (HPLMN) for the UE is not programmed on a Universal Mobile Telecommunications System (UMTS) Subscriber Identity Module (USIM) of the UE, reframing from encrypting the subset of NAS protocol IEs in the first initial NAS message.

20. The method of claim 16, wherein the first initial NAS message comprises a registration request message.

21. The method of claim 16, wherein the subset of NAS protocol IEs consists of a mobile identity for the UE, a UE security capability indicating one or more NAS security algorithms supported by the UE, and a security key set identifier for the NAS security context.

22. The method of claim 16, further comprising:
in an instance in which the registration type indicates a non-emergency, encrypting, in the first initial NAS message, the subset of NAS protocol IEs that consists only of those NAS protocol IEs that are designated for security-related handling.

23. The method of claim 16, further comprising:
in an instance in which the registration type indicates an emergency, sending the first initial NAS message to the AMF without encrypting the subset of NAS protocol IEs that consists only of those NAS protocol IEs that are designated for security-related handling.

24. The method of claim 16, wherein the NAS security algorithm and the security key set identifier are received at the UE in a security mode command message transmitted from the AMF.

25. The method of claim 16, wherein the subsequent NAS message comprises a security mode complete message, the security mode complete message including the NAS message container that encapsulates therein the second initial NAS message.

26. A method comprising:
(i) in an instance in which a Non-Access Stratum (NAS) security context exists for communication between an Access and Mobility Management Function (AMF) in a fifth-generation core network (5GCN) and a user equipment (UE) in the 5GCN, carrying out initiation of a NAS registration procedure to establish a NAS communication session between the UE and the AMF of the 5GCN by causing the AMF to perform at least:
receiving, at the AMF, from the UE, an initial NAS message comprising a subset of NAS protocol Information Elements (IEs) from among a full set of NAS protocol IEs to be used during initiation of the NAS registration procedure, the subset of NAS protocol IEs consisting only of NAS protocol IEs that are designated for security-related handling, the initial NAS message further comprising a NAS message container encompassing the full set of NAS protocol IEs including the subset of NAS protocol IEs that consists of only those NAS protocol IEs that are designated for security-related handling and one or more additional NAS protocol IEs, the NAS message container in the initial NAS message being encrypted using one or more keys associated with the NAS security context, wherein the subset of NAS protocol IEs comprises an IE that indicates a registration type associated with the NAS registration procedure;
establishing, based at least upon the subset of NAS protocol IEs that are designated for security-related handling during the NAS registration procedure, a new NAS security context for communication between the AMF and the UE in the 5GCN;
generating a new NAS security algorithm and a new NAS security key set identifier associated with the new NAS security context; and
sending, from the AMF, to the UE, the new NAS security algorithm and the new NAS security key set identifier associated with the new NAS security context, and
(ii) in an instance in which a NAS security context does not exist for communication between the AMF and the UE in the 5GCN, carrying out initiation of the NAS registration procedure in multiple phases to establish the NAS communication session between the UE and the AMF, by causing the AMF to perform:
wherein, during a first phase of the NAS registration procedure, said initiation of the NAS registration procedure comprises:
receiving, at the AMF, from the UE, a first initial NAS message including the subset of NAS protocol IEs selected from among the full set of NAS protocol IEs to be used during initiation of the NAS registration procedure, the subset of NAS protocol IEs consisting only of those NAS protocol IEs that are designated for security-related handling during initiation of the NAS registration procedure to establish the NAS communication session between the UE and the AMF;
establishing a NAS security context for use by the UE in communication with the 5GCN; and
in response to the first initial NAS message, sending, to the UE, a NAS security algorithm and a security key set identifier associated with the NAS security context established for use by the UE in communication with the 5GCN, and
wherein, during a second phase of the NAS registration procedure, said initiation of the NAS registration procedure further comprises:
receiving, from the UE, a subsequent NAS message, the subsequent NAS message including a second initial NAS message encapsulated within a NAS message container of the subsequent NAS message, the second initial NAS message defining a same message type as the first initial NAS message, the second initial NAS message comprising the full set of NAS protocol IEs including the subset of NAS protocol IEs that are designated for security-related handling and one or more additional NAS protocol IEs, and wherein the NAS message container of the subsequent NAS message is encrypted using the NAS security algorithm provided to the UE by the AMF during the first phase of the NAS registration procedure.

27. The method of claim 26, wherein the subset of NAS protocol IEs that are designated for security-related handling are encrypted in the first initial NAS message using a public key of a Home Public Land Mobile Network (HPLMN) for the UE.

28. The method of claim 26, wherein the first initial NAS message comprises a registration request message.

29. The method of claim 26, wherein the subset of NAS protocol IEs consists of a mobile identity for the UE, a UE security capability indicating one or more NAS security algorithms supported by the UE, a registration type, and the security key set identifier for the NAS security context.

30. The method of claim 26, wherein the NAS security algorithm and the security key set identifier are provided to the UE during the first phase in a security mode command message.

31. The method of claim 26, wherein the subsequent NAS message comprises a security mode complete message comprising the NAS message container, the NAS message container containing the second initial NAS message.

32. A User equipment (UE) comprising:
at least one processor; and
at least one memory storing instructions thereon that, when executed by the at least one processor, cause the UE to perform at least:
(i) determining whether the UE has a Non-Access Stratum (NAS) security context for communication with an Access and Mobility Management Function (AMF) of a fifth-generation core network (5GCN); and (ii) in an instance in which the UE has a NAS security context for communication with the AMF, initiating a NAS registration procedure to establish a NAS communication session between the UE and the AMF of the 5GCN by causing the UE to perform at least:

identifying, from among a full set of NAS protocol Information Elements (IEs) to be used during the NAS registration procedure, a subset of NAS protocol IEs consisting only of NAS protocol IEs that are designated for security-related handling during the initiation of the NAS registration procedure, wherein the subset of NAS protocol IEs comprises an IE that indicates a registration type associated with the NAS registration procedure:

inserting the subset of NAS protocol IEs in cleartext form to an initial NAS message;

inserting a NAS message container to the initial NAS message:

encapsulating, in the NAS message container of the initial NAS message, the full set of NAS protocol IEs to be used during initiation of the NAS registration procedure including the subset of NAS protocol IEs that are designated for security-related handling during the NAS registration procedure and one or more additional IEs:

encrypting the NAS message container in the initial NAS message using one or more keys associated with the NAS security context; and sending the initial NAS message to the AMF to initiate the NAS registration procedure.

33. An Access and Mobility Management Function (AMF) device configured for communication in a fifth-generation core network (5GCN), the AMF device comprising:

at least one processor; and at least one memory storing instructions thereon that, when executed by the at least one processor, cause the AMF device to perform at least:

in an instance in which a Non-Access Stratum (NAS) security context exists for communication between the AMF device and a user equipment (UE) in the 5GCN, carrying out initiation of a NAS registration procedure to establish a NAS communication session between the UE and the AMF device of the 5GCN by causing the AMF device to perform at least:

receiving, from the UE, an initial NAS message comprising a subset of NAS protocol Information Elements (IEs) from among a full set of NAS protocol IEs, the subset of NAS protocol IEs consisting only of NAS protocol IEs that are designated for security-related handling during the NAS registration procedure, the initial NAS message further comprising a NAS message container, the NAS message container having encapsulated therein the full set of NAS protocol IEs including the subset of NAS protocol IEs that are designated for security-related handling and one or more additional NAS protocol IEs, the NAS message container in the initial NAS message being encrypted using one or more keys associated with the NAS security context, wherein the subset of NAS protocol IEs comprises an IE that indicates a registration type associated with the NAS registration procedure:

in an instance in which a new NAS security context is to be established for communication between the AMF device and the UE in the 5GCN, establishing the new NAS security context and generating a new NAS security algorithm and a new NAS security key set identifier associated with the new NAS security context; and in an instance in which the new NAS security context is established, sending, to the UE, the new NAS security algorithm and the new NAS security key set identifier associated with the new NAS security context.

34. A method comprising:

(i) determining, using a user equipment (UE), whether the UE has a Non-Access Stratum (NAS) security context for communication with an Access and Mobility Management Function (AMF) of a fifth-generation core network (5GCN); and (ii) in an instance in which the UE has a NAS security context for communication with the AMF, initiating a NAS registration procedure to establish a NAS communication session between the UE and the AMF of the 5GCN by causing the UE to perform at least:

identifying, from among a full set of NAS protocol Information Elements (IEs) to be used during the NAS registration procedure, a subset of NAS protocol IEs that consists only of NAS protocol IEs that are designated for security-related handling during the NAS registration procedure, wherein the subset of NAS protocol IEs comprises an IE that indicates a registration type associated with the NAS registration procedure;

inserting, in an initial NAS message, the subset of NAS protocol IEs that are designated for security-related handling;

inserting a NAS message container to the initial NAS message;

encapsulating, within the NAS message container in the initial NAS message, the full set of NAS protocol IEs including the subset of NAS protocol IEs that are designated for security-related handling and one or more additional NAS protocol IEs;

encrypting, using one or more keys associated with the NAS security context, the NAS message container in the initial NAS message, wherein the subset of NAS protocol IEs designated for security-related handling that are in the initial NAS message but outside the NAS message container are in cleartext form; and sending the initial NAS message to the AMF.

35. A method comprising:

in an instance in which a Non-Access Stratum (NAS) security context exists for communication between an Access and Mobility Management Function (AMF) of a fifth-generation core network (5GCN) and a user equipment (UE) in the 5GCN, carrying out a NAS registration procedure to establish a NAS communication session between the UE and the AMF of the 5GCN by causing the AMF to perform at least:

receiving, at the AMF, from the UE, an initial NAS message comprising a subset of NAS protocol Information Elements (IEs) from among a full set of NAS protocol IEs to be used during initiation of the NAS procedure, the subset of NAS protocol IEs consisting only of those NAS protocol IEs that are designated for security-related handling during initiation of the NAS registration procedure, the initial NAS message further comprising a NAS message container, wherein the full set of NAS protocol IEs including the subset of NAS protocol IEs designated for security-related handling and one or more additional NAS protocol IEs are encapsulated in the NAS message container in the initial NAS message, the NAS message container in the initial NAS message being encrypted using one or more keys associated with the NAS security context, wherein the subset of NAS protocol IEs comprises an IE that indicates a registration type associated with the NAS registration procedure;

in an instance in which a new NAS security context is to be established for communication between the AMF and the UE in the 5GCN, establishing the new NAS security context and generating a new NAS security algorithm and a new NAS security key set identifier associated with the new NAS security context; and in an instance in which the new NAS security context is established, sending, to the UE, the new NAS security algorithm and the new NAS security key set identifier associated with the new NAS security context.

* * * * *